US011081086B2

(12) United States Patent
Chen et al.

(10) Patent No.: US 11,081,086 B2
(45) Date of Patent: Aug. 3, 2021

(54) DISPLAY METHOD AND APPARATUS

(71) Applicant: HUAWEI TECHNOLOGIES CO., LTD., Guangdong (CN)

(72) Inventors: Hao Chen, Nanjing (CN); Xiaoxiao Chen, Nanjing (CN); Qing Wang, Wuhan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/612,936

(22) PCT Filed: Oct. 26, 2017

(86) PCT No.: PCT/CN2017/107893
§ 371 (c)(1),
(2) Date: Nov. 12, 2019

(87) PCT Pub. No.: WO2019/080065
PCT Pub. Date: May 2, 2019

(65) Prior Publication Data
US 2020/0168176 A1     May 28, 2020

(51) Int. Cl.
*G09G 5/12*       (2006.01)
*G06F 3/14*       (2006.01)
(Continued)

(52) U.S. Cl.
CPC ............. *G09G 5/12* (2013.01); *G06F 3/1423* (2013.01); *G09G 5/14* (2013.01); *H04L 12/282* (2013.01);
(Continued)

(58) Field of Classification Search
CPC ........ G09G 5/12; G09G 5/14; G09G 2354/00; G09G 2356/00; G09G 2360/04;
(Continued)

(56) References Cited

U.S. PATENT DOCUMENTS

| 8,928,587 B1* | 1/2015 | Smus ...................... H04W 4/38 345/156 |
| 9,578,069 B1* | 2/2017 | Beech ................. H04L 65/1069 |

(Continued)

FOREIGN PATENT DOCUMENTS

| CN | 104270668 A | 1/2015 |
| CN | 105094732 A | 11/2015 |

(Continued)

OTHER PUBLICATIONS

PCT International Search Report and Written Opinion in International Application No. PCT/CN2017/107893, dated Jul. 11, 2018, 14 pages (With Partial English Translation).

(Continued)

*Primary Examiner* — Sahlu Okebato
(74) *Attorney, Agent, or Firm* — Fish & Richardson P.C.

(57) ABSTRACT

One example display method includes in response to receiving a display request from a target display device, determining a first display device and a second display device that support display of a target service, when a first distance between the first display device and a user is less than a second distance between the second display device and the user, obtaining current first display data of the target service from the target display device and sending the current first display data to the first display device, and when that the first distance reported by the first display device is greater than the second distance reported by the second display device is subsequently obtained, obtaining current second display data of the target service from the target display device and sending the current second display data to the first display device and the second display device.

20 Claims, 20 Drawing Sheets

(51) Int. Cl.
*G09G 5/14* (2006.01)
*H04L 12/28* (2006.01)

(52) U.S. Cl.
CPC ..... *G09G 2354/00* (2013.01); *G09G 2356/00* (2013.01); *G09G 2360/04* (2013.01); *G09G 2370/06* (2013.01); *G09G 2370/08* (2013.01); *H04L 2012/2849* (2013.01)

(58) Field of Classification Search
CPC .......... G09G 2370/06; G09G 2370/08; G09G 2330/021; G06F 3/1423; G06F 3/013; G06F 3/012; G06F 3/1454; G06F 3/14; H04L 12/282; H04L 2012/2849; G08C 2201/91; H04N 21/442
See application file for complete search history.

(56) References Cited

U.S. PATENT DOCUMENTS

| | | | |
|---|---|---|---|
| 9,591,346 B2 | 3/2017 | Hu et al. | |
| 10,025,447 B1* | 7/2018 | Dixit | G06F 3/011 |
| 10,268,447 B1* | 4/2019 | Dodge | G06F 3/167 |
| 10,405,295 B2* | 9/2019 | Shaw | H04W 16/10 |
| 2013/0067331 A1* | 3/2013 | Glazer | H04L 65/607 |
| | | | 715/719 |
| 2013/0316686 A1* | 11/2013 | Subbaramoo | H04W 12/02 |
| | | | 455/418 |
| 2015/0244853 A1 | 8/2015 | Shin et al. | |
| 2016/0226956 A1 | 8/2016 | Hong et al. | |
| 2017/0235435 A1 | 8/2017 | Sohn et al. | |

FOREIGN PATENT DOCUMENTS

| | | |
|---|---|---|
| CN | 105979392 A | 9/2016 |
| CN | 106063362 A | 10/2016 |
| CN | 106488316 A | 3/2017 |
| CN | 106534565 A | 3/2017 |
| CN | 106730827 A | 5/2017 |
| CN | 106936836 A | 7/2017 |
| CN | 106951055 A | 7/2017 |
| GB | 2454219 A | 5/2009 |
| WO | 2011099814 A2 | 8/2011 |

OTHER PUBLICATIONS

Extended European Search Report issued in European Application No. 17929725.4 on Feb. 17, 2020, 19 pages.
Office Action issued in Chinese Application No. 201780089410.X dated Jun. 19, 2020, 17 pages (with English translation).
Office Action issued in Chinese Application No. 201780089410.X dated Nov. 26, 2020, 5 pages.

* cited by examiner

DISPLAY METHOD AND APPARATUS

CROSS-REFERENCE TO RELATED APPLICATIONS

This application is a national stage of International Application No. PCT/CN2017/107893, filed on Oct. 26, 2017, which is hereby incorporated by reference in its entirety.

TECHNICAL FIELD

Embodiments of this application relate to the field of communications technologies, and in particular, to a display method and an apparatus.

BACKGROUND

In a smart home (smart home, also referred to as home automation), a house is used as a platform, and household life related facilities are integrated by using an integrated cabling technology, a network communications technology, a security protection technology, an automatic control technology, and an audio and video technology, to construct an efficient management system for residential facilities and family schedule affairs, thereby improving safety, convenience, comfort and artistry of home, and achieving an environmental and energy-saving living environment.

Currently, in some smart home application scenarios, a plurality of smart appliances in a same network may be automatically managed based on a location of a user. For example, when it is detected that the user enters a living room, a television in the living room is used to display a medium, and when it is detected that the user enters a bedroom, the medium is switched to and played on a television in the bedroom.

However, in a period of time in which the user moves from the living room to the bedroom, seamless switchover of the medium between the two televisions cannot be implemented, reducing efficiency of interworking between a plurality of devices.

SUMMARY

Embodiments of this application provide a display method and an apparatus, to implement seamless switchover of a display service between a plurality of devices, thereby improving efficiency of collaboration between the plurality of devices.

To achieve the foregoing objectives, the following technical solutions are used in the embodiments of this application.

According to a first aspect, an embodiment of this application provides a display method, including: A control device receives a display request sent by a target display device when the target display device needs to display a target service. In response to the display request, the control device determines a first display device and a second display device that support display of the target service. Then, the control device requests the first display device to report a first distance away from a user, and requests the second display device to report a second distance away from the user. When the first distance is less than the second distance, it indicates that the user is closer to the first display device. The control device may obtain current first display data of the target service from the target display device, and send the first display data to the first display device, so that the first display device displays the target service based on the first display data. When the control device subsequently obtains that the first distance reported by the first display device is less than the second distance reported by the second display device, it indicates that the user is closer to the second display device in this case. The control device may obtain current second display data of the target service from the target display device, and send the second display data to the first display device and the second display device, so that both the first display device and the second display device display the target service based on the second display data.

In other words, when the control device switches the target service from the first display device to the second display device, both the first display device and the second display device display the target service in a period of time. In this way, the user may still view the target service played in real time in a process of leaving the first display device and approaching the second display device, to ensure that the target service can be smoothly switched between different display devices, and seamless connection of the target service between the different display devices is implemented in terms of user vision, thereby improving efficiency of collaboration between a plurality of devices.

In a possible design method, the first display data includes at least one layer that is of all layers of the target service and that supports display by the first display device; and/or the second display data includes at least one layer that is of all layers of the target service and that supports display by the second display device.

In a possible design method, after that the control device sends the second display data to the first display device and the second display device, the method further includes: When preset duration in which the second display device displays the target service expires, it may be considered that the user has moved to a viewing range of the second display device, and therefore, the control device may stop sending the second display data to the first display device, to reduce power consumption of the first display device.

In a possible design method, after that the control device sends the second display data to the first display device and the second display device, the method further includes: When the second distance between the second display device and the user is less than a preset distance threshold, it may be determined that a current focus of the user has been transferred to the second display device, and therefore, the control device may stop sending the second display data to the first display device, to reduce power consumption of the first display device.

In a possible design method, after that the control device sends second display data to the first display device and the second display device, the method further includes: When the second distance between the second display device and the user is less than a preset distance threshold, the control device determines duration in which the distance between the user and the second display device is less than the distance threshold; and if the duration is greater than a preset duration threshold, it may further be determined that a current focus of the user has been transferred to the second display device, and therefore, the control device may stop sending the second display data to the first display device.

In a possible design method, after that the control device sends the first display data to the first display device, the method further includes: When the control device subsequently obtains that the first distance reported by the first display device is equal to the second distance reported by the second display device, the control device instructs the first display device and the second display device to perform face detection. If a face detection result reported by the first display device is obtained, it indicates that a current focus of the user falls on the first display device. In this case, the control device may continue sending the current second display data of the target service to the first display device without needing to switch the target service to the second display device for display, so that the first display device continues displaying the target service.

Correspondingly, if a face detection result reported by the second display device is obtained, it indicates that the current focus of the user has been transferred from the first display device to the second display device. Therefore, the control device may send the current second display data of the target service to the first display device and the second display device, so that both the first display device and the second display device display the target service, to ensure that the target service can be smoothly switched between the different display devices. In addition, seamless connection of the target service between the different display devices is implemented in terms of user vision, thereby improving efficiency of collaboration between a plurality of devices.

According to a second aspect, an embodiment of this application provides a display method, including: When displaying a target service, a first display device sends a display request of the target service to a control device. In response to the display request, the control device determines a second display device supporting display of the target service. The control device requests the first display device to report a first distance away from a user, and requests the second display device to report a second distance away from the user. When the first distance is greater than the second distance, it indicates that the user is closer to the second display device in this case. While instructing the first display device to continue displaying the target service, the control device may obtain current display data of the target service from the first display device, and send the current display data of the target service to the second display device. In this case, the first display device and the second display device each have the current display data of the target service, so that both the first display device and the second display device can display the target service based on the display data.

According to a third aspect, an embodiment of this application provides a display method, including: A target display device backs up an installed application, a stored file, and stored data in a control device, and keeps synchronous with the control device. When needing to display a target service, the target display device sends a display request of the target service to the control device. In response to the display request, the control device determines a first display device and a second display device that can support display of the target service. Then, the control device requests the first display device to report a first distance away from a user, and requests the second display device to report a second distance away from the user. When the first distance is less than the second distance, it indicates that the user is closer to the first display device in this case, and the control device may instruct the first display device to display the target service. When the control device subsequently obtains that the first distance reported by the first display device is less than the second distance reported by the second display device, it indicates that the user is closer to the second display device in this case. The control device may send current display data of the target service to the second display device, and instruct the first display device to continue displaying the target service, so that both the first display device and the second display device can display the target service based on the current display data of the target service.

According to a fourth aspect, an embodiment of this application provides a display method, including: When displaying a target service, a first display device determines that a candidate device that can display the target service further includes a second display device. In this case, the first display device may obtain a first distance away from a user, and instruct the second device to report a second distance away from the user. When the first distance is greater than the second distance, it indicates that the user is closer to the second display device in this case, and the first display device may send current display data of the target service to the second display device. In this case, the first display device and the second display device each have the current display data of the target service, so that both the first display device and the second display device can display the target service based on the display data.

According to a fifth aspect, an embodiment of this application provides a display system, including a control device, and a first display device, a second display device, and a target display device that communicate with the control device. The target display device is configured to: when needing to display a target service, send a display request to the control device. The control device is configured to: in response to the display request, determine the first display device and the second display device that support display of the target service; request the first display device to report a first distance away from a user, and request the second display device to report a second distance away from the user; and when the first distance is less than the second distance, obtain current first display data of the target service from the target display device, and send the first display data to the first display device. The first display device is configured to display the target service based on the first display data. The control device is further configured to: when subsequently obtaining that the first distance reported by the first display device is less than the second distance reported by the second display device, obtain current second display data of the target service from the target display device, and send the second display data to the first display device and the second display device. The first display device is further configured to display the target service based on the second display data. The second display device is configured to display the target service based on the second display data.

According to a sixth aspect, an embodiment of this application provides a control device, including a processor, and a memory and a transceiver that are both connected to the processor. The memory stores program code, and the processor runs the program code to instruct the control device to perform the following steps: receiving a display request sent by a target display device when the target display device needs to display a target service; determining, in response to the display request, a first display device and a second display device that support display of the target service; requesting the first display device to report a first distance away from a user, and requesting the second display device to report a second distance away from the user; when the first distance is less than the second distance, obtaining current first display data of the target service from the target display device, and sending the first display data to the first display device, so that the first display device displays the target service based on the first display data; and when that the first distance reported by the first display device is less than the second distance reported by the second display device is subsequently obtained, obtaining current second display data of the target service from the target display device, and sending the second display data to the first display device and the second display device, so that both the first display device and the second display device display the target service based on the second display data.

In a possible design method, the first display data includes at least one layer that is of all layers of the target service and that supports display by the first display device; and/or the second display data includes at least one layer that is of all layers of the target service and that supports display by the second display device.

In a possible design method, after the sending second display data to the first display device and the second display device, the program code further includes: when preset duration in which the second display device displays the target service expires, stopping sending the second display data to the first display device.

In a possible design method, after the sending second display data to the first display device and the second display device, the program code further includes: when the second distance is less than a preset distance threshold, stopping sending the second display data to the first display device.

In a possible design method, after the sending second display data to the first display device and the second display device, the program code further includes: when the second distance is less than a preset distance threshold, determining duration in which the distance between the user and the second display device is less than the distance threshold; and if the duration is greater than a preset duration threshold, stopping sending the second display data to the first display device.

In a possible design method, after the sending first display data to the first display device, the program code further includes: when that the first distance reported by the first display device is equal to the second distance reported by the second display device is subsequently obtained, instructing the first display device and the second display device to perform face detection; and if a face detection result reported by the first display device is obtained, obtaining the current second display data of the target service from the target display device, and sending the second display data to the first display device; or if a face detection result reported by the second display device is obtained, obtaining the current second display data of the target service from the target display device, and sending the second display data to the first display device and the second display device.

In a possible design method, the control device further includes a display connected to the processor, and the display is configured to display the target service based on the first display data and/or second display data sent by the target display device.

According to a seventh aspect, an embodiment of this application provides a computer-readable storage medium, storing an instruction, where when the instruction is run on any one of the foregoing control devices, the control device is enabled to perform any one of the foregoing display methods.

According to an eighth aspect, an embodiment of this application provides a computer program product including an instruction, where when the computer program product is run on any one of the foregoing control devices, the control device is enabled to perform any one of the foregoing display methods.

In the embodiments of this application, names of the foregoing control devices and a name of each component in the control device do not constitute a limitation on the devices. During actual implementation, these devices or components may appear by using other names. Provided that functions of the devices or components are similar to those in the embodiments of this application, the devices or components fall within the scope of the claims and their equivalent technologies of this application.

In addition, for technical effects brought by any one of the design methods in the second aspect to the eighth aspect, refer to technical effects brought by different design methods in the first aspect. Details are not described herein again.

DESCRIPTION OF EMBODIMENTS

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the description of the embodiments of this application, unless otherwise stated, "a plurality of" means two or more than two.

Figure 1:
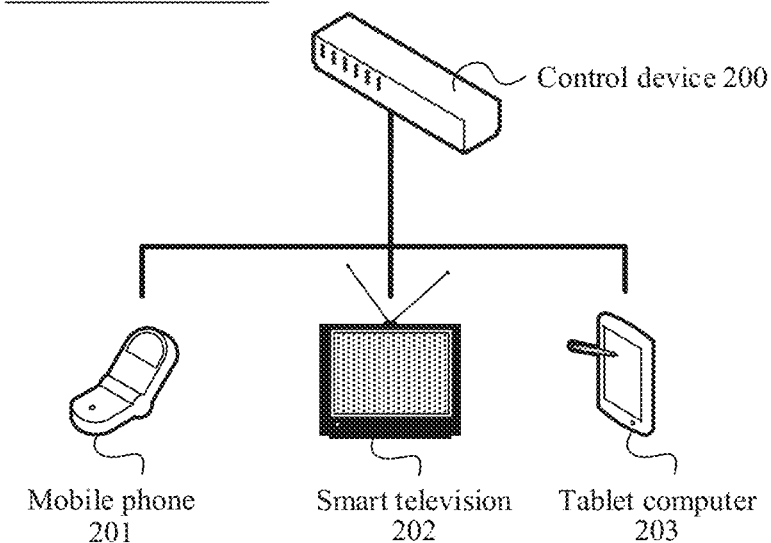
FIG. 1 is a schematic architectural diagram 1 of a display system according to an embodiment of this application.

A display method provided in an embodiment of this application may be applied to a display system 100 shown in FIG. 1.

As shown in FIG. 1, the display system 100 includes a control device 200 and at least two display devices (for example, a mobile phone 201, a smart television 202, and a tablet computer 203 shown in FIG. 1) that can communicate with the control device 200.

The control device 200 may be connected to each display device by using a wireless network (for example, Wi-Fi, Bluetooth, or a cellular mobile network) or a wired network (for example, an optical fiber). This is not limited in this embodiment of this application.

Figure 2:
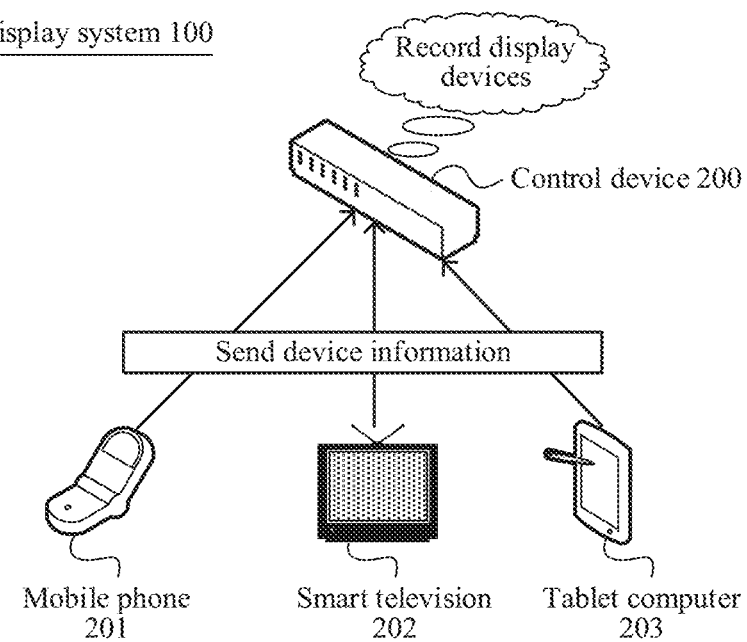
FIG. 2 is a schematic structural diagram 2 of a display system according to an embodiment of this application.

In some embodiments of this application, the control device 200 stores device information that can reflect a display capability and the like of each display device. The mobile phone 201 is used as an example. After establishing a connection to the control device 200, as shown in FIG. 2, the mobile phone 201 may send device information of the mobile phone 201 to the control device 200, for example, screen resolution of the mobile phone 201, a rendering capability of a graphics processing unit (Graphics Processing Unit, GPU), and a frequency of a central processing unit (Central Processing Unit, CPU). The control device 200 stores the received device information of the mobile phone 201 in a memory of the control device 200 for recording.

Similarly, for each display device connected to the control device 200, device information of the display device may be recorded in the control device 200. Subsequently, when a display device initiates a target service (for example, playing a video or running a game) that needs to be displayed, the display device may send a corresponding display request and display data corresponding to the target service to the control device 200. In this case, the control device 200 may determine, based on the recorded device information of each display device, a proper display device as a target device for the current target service, and send the display data corresponding to the target service to the target device for display.

Figure 3:
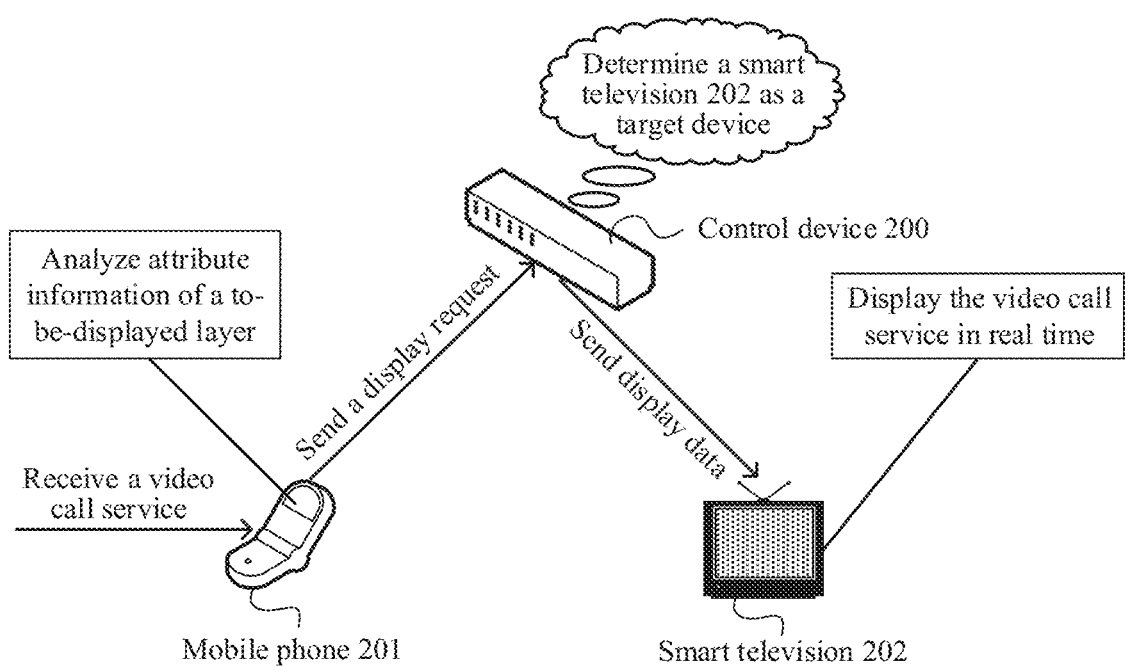
FIG. 3 is a schematic structural diagram 3 of a display system according to an embodiment of this application.

For example, as shown in FIG. 3, both the mobile phone 201 and the smart television 202 are connected to the control device 200. After receiving a video call service, the mobile phone 201 may analyze attribute information of a to-be-displayed layer that needs to be displayed for the video call service, for example, analyze content (a video, a text, or a picture), a size, and privacy that are of the layer, and then the mobile phone 201 may add, to a display request, the attribute information that is of the to-be-displayed layer and that is obtained through analysis, and send the display request to the control device 200.

A layer (view or layer) is a basic composition unit of a display interface on a display device. After a plurality of layers are stacked in sequence, a final display effect of the display interface is formed. Each layer may include one or more controls, and a definition rule icon of each layer and a sequence of the plurality of layers may be defined by a developer during application development. An Android system is used as an example. Some basic layers, such as ImageView, AdapterView, and RelativeLayout, are defined in the Android system. A developer may use or modify these basic layers to draw a customized layer.

Figure 4:
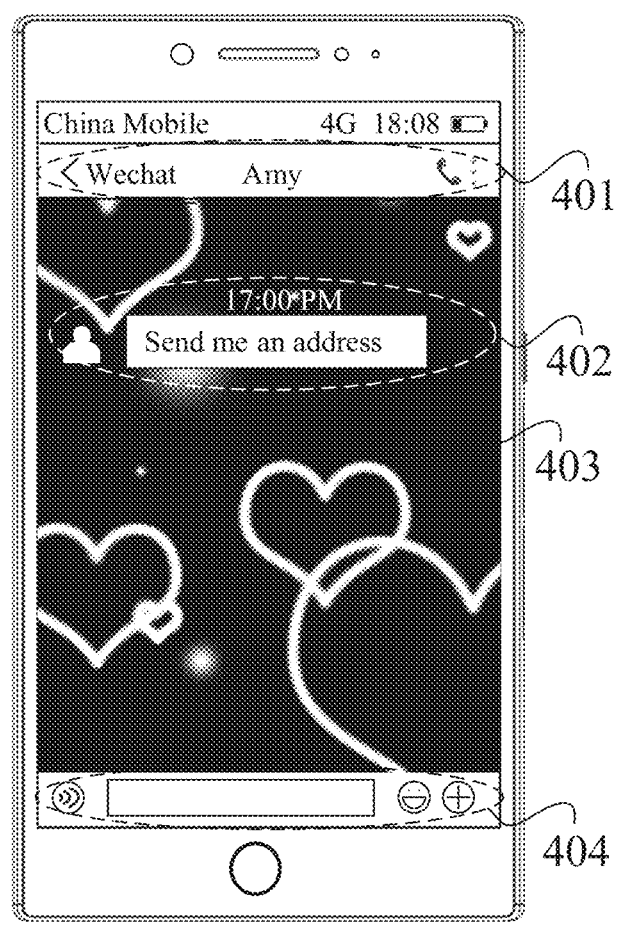
FIG. 4 is a schematic diagram of layer division according to an embodiment of this application.

As shown in FIG. 4, a chat interface of a WeChat application is used as an example. A status bar 401 of WeChat and an input bar 404 used for input that are in the chat interface may be defined as layer 1, and a chat background in the chat interface is defined as layer 2, a chat record of a user in the chat interface is defined as layer 3, and layer 3 is located above layer 2.

In this case, when the mobile phone 201 needs to display the chat interface (namely, the target service) in FIG. 4, the WeChat application may determine, according to a predefined layer rule, three layers included in the chat interface layer 1 to layer 3, and analyze attributes, such as content (a video, a text, or a picture), a size, and privacy, of each layer. For example, privacy such as a contact portrait and a name is included in layer 1 and layer 3, and therefore, privacy of layer 1 and layer 3 is relatively high. However, privacy of the user is not included in layer 2, and therefore privacy of layer 2 is relatively low. Then, attribute information of layer 1 to layer 3 that is obtained through analysis is added to the display request, and the display request is sent to the control device 200.

Still as shown in FIG. 3, because the device information of each display device is recorded in the control device 200, the control device 200 may match the attribute information of the to-be-displayed layer sent by the mobile phone 201 with the device information of each display device. For example, when the attribute information indicates that the size of the to-be-displayed layer is 10 M and the privacy is relatively weak, but the recorded smart television 202 can support display of a layer whose size is greater than 8M and privacy is relatively weak, the control device 200 may use the smart television 202 as a target device for displaying the foregoing video call service.

In this case, the control device 200 may send response information of the display request to the mobile phone 201, to trigger the mobile phone 201 to generate display data of the video call service (namely, data of the to-be-displayed layer) and send the display data to the control device 200. As shown in FIG. 3, the control device 200 sends the display data to the smart television 202, so that the smart television 202 displays an image of the video call service originally received by the mobile phone 201.

Certainly, if a connection relationship is established between the mobile phone 201 and the smart television 202, the control device 200 may also add an identifier of the smart television 202 to the response information. In this way, the mobile phone 201 may send, based on the identifier of the smart television 202, the generated display data of the video call service to the smart television 202 for display.

Alternatively, the control device 200 may have an image processing capability, for example, an image rendering capability. In this case, after receiving the display data of the video call service generated by the mobile phone 201, the control device 200 may perform secondary rendering on the display data based on the device information such as resolution of the smart television 202, to obtain display data that conforms to a display capability of the smart television 202, and send the display data to the smart television 202 for display.

It may be learned that, in the display method provided in this embodiment of this application, the plurality of display devices of the user may be interconnected with the control device 200, and the device information of each display device is recorded in the control device 200, so that the control device may intelligently select, based on the device information of each display device, a proper target device for the current target service, and project a layer corresponding to the target service to the target device for display.

In other words, any display device in the display system 100 may be used as a source device that provides screen source data when triggering the target service, and the control device 200 in the display system 100 may intelligently determine a screen-projection occasion and a controlled device displaying the target service, so that the source device and the controlled device in a multi-screen display scenario may be flexibly set based on a service requirement, thereby improving efficiency of collaboration between the plurality of devices.

Figure 5:
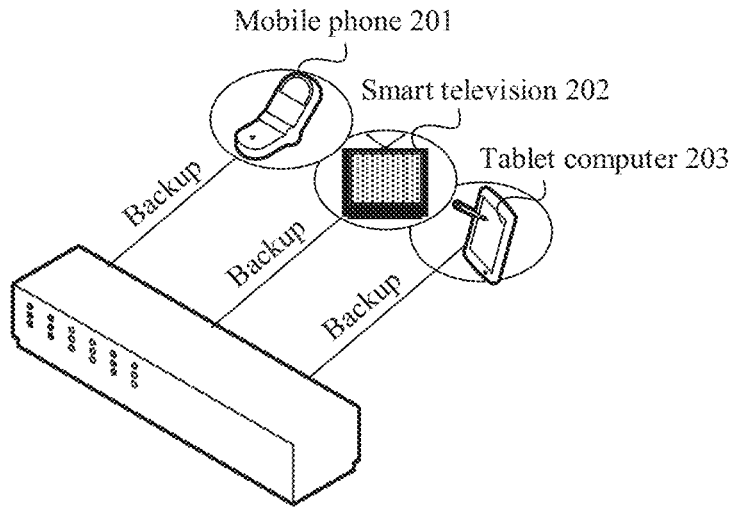
FIG. 5 is a schematic structural diagram 4 of a display system according to an embodiment of this application.

In some other embodiments of this application, as shown in FIG. 5, each display device in the display system 100 may further back up all data of the display device in the control device 200. For example, the mobile phone 201 may back up all installed applications, stored files, and stored data in the control device 200.

Figure 6:
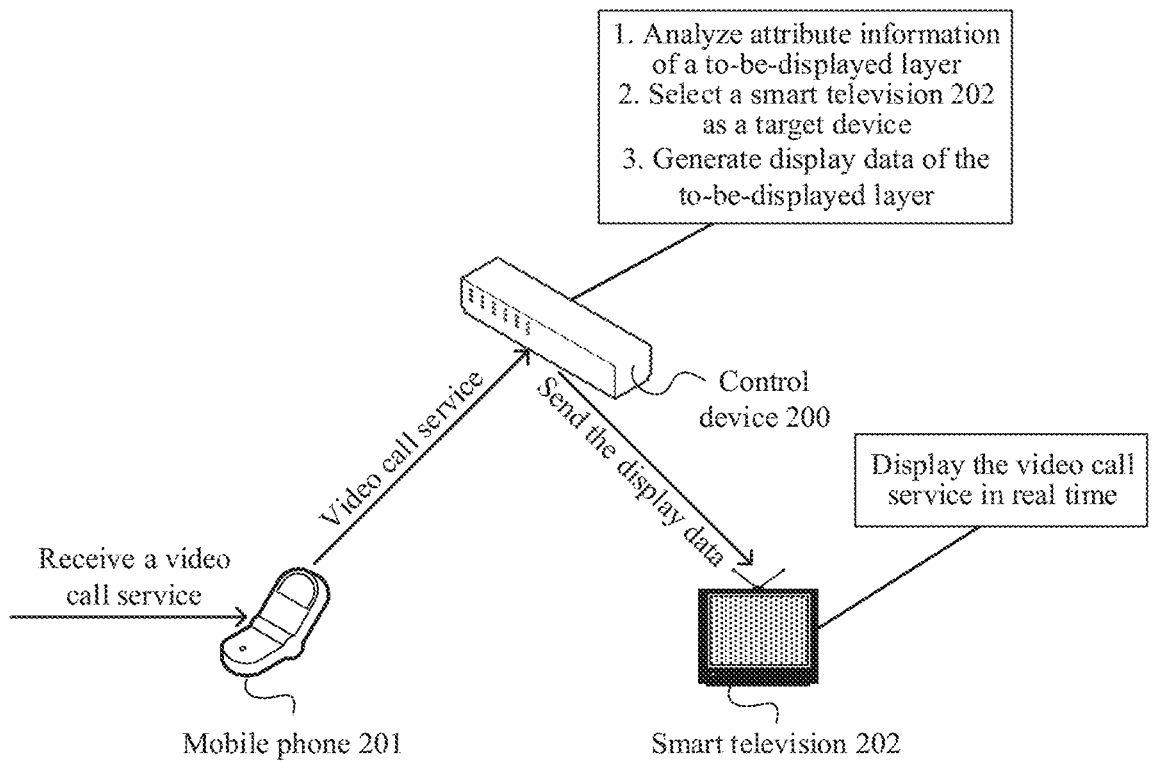
FIG. 6 is a schematic structural diagram 5 of a display system according to an embodiment of this application.

In this case, as shown in FIG. 6, when a display device (for example, the mobile phone 201) initiates a new target service, the mobile phone 201 may directly transfer the target service to the control device 200. Because the control device 200 includes all data of the mobile phone 201, the control device 200 may analyze, in place of the mobile phone 201, attribute information of a to-be-displayed layer of the target service for the mobile phone 201, and then select a proper target device (for example, the smart television 202) for the target service based on the attribute information, and may further generate, in place of the mobile phone 201, the to-be-displayed layer and send the to-be-displayed layer to the smart television 202 for display.

In this way, provided that the mobile phone 201 initiating the target service reports the target service to the control device 200, a smart screen projection function of projecting the target service to another display device for display can be implemented, thereby reducing implementation complexity and power consumption of each display device in the display system 100.

In addition, when determining the proper target device for the target service, the control device 200 may further obtain a distance between the user and each display device in the display system 100 in this case, and determine a display device closest to the user as the target device for displaying the target service.

Figure 7:
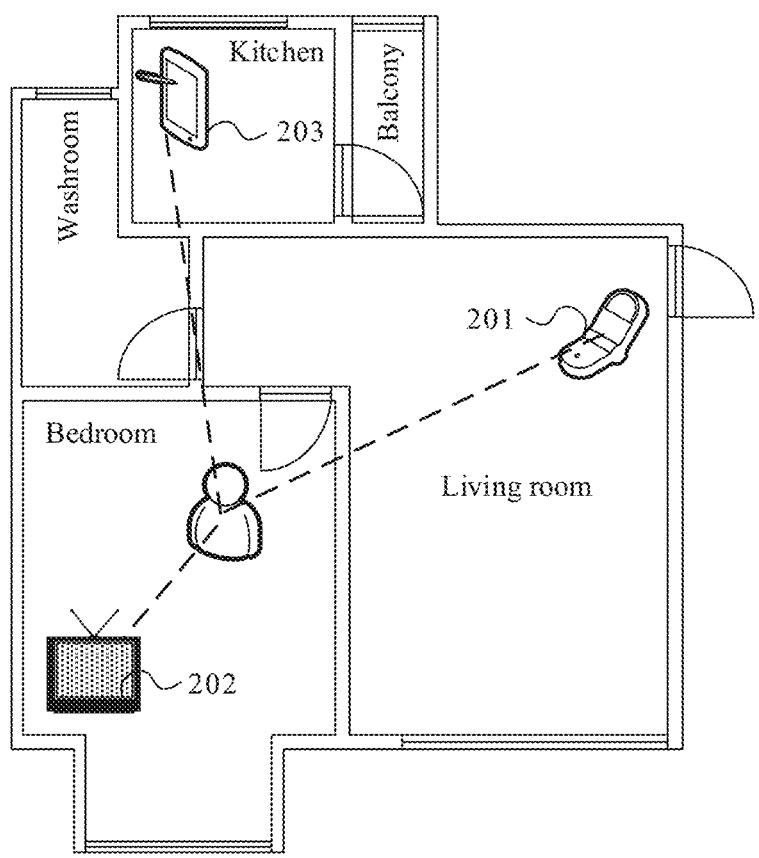
FIG. 7 is a schematic structural diagram 6 of a display system according to an embodiment of this application.

For example, as shown in FIG. 7, the user places the mobile phone 201 in a living room and enters a bedroom to turn on the smart television 202. After receiving a video call service, the mobile phone 201 sends attribute information of a to-be-displayed layer of the video call service to the control device 200. The control device 200 may determine, based on the attribute information of the to-be-displayed layer, a plurality of display devices that support display of the to-be-displayed layer, for example, the tablet computer 203, the smart television 202, and the mobile phone 201. In this case, the control device 200 may obtain a distance between the user and each of the three display devices by using a sensor that is disposed on the display device, for example, a distance sensor or a camera, and then use a display device closest to the user (for example, the smart television 202 located in the bedroom in FIG. 7) as a target device for displaying the to-be-displayed layer.

It should be noted that a specific implementation form of the control device 200 in the display system 100 is not limited in this embodiment of this application. For example, as shown in (a) in FIG. 8, the control device 200 may be connected to each display device in a form of an independent entity device. Alternatively, as shown in (b) in FIG. 8, the control device 200 may be integrated in one or more display devices in a form of a function module. In other words, the control device 200 may alternatively be a display device that has a display function and that is in the display system 100. For example, in (b) in FIG. 8, the mobile phone 201 may be used as the control device 200 of the display system 100, and meanwhile, the mobile phone 201 is also a display device in the display system 100. Alternatively, as shown in (c) in FIG. 8, the control device 200 may be one or more servers (or virtual machines) disposed in a cloud. In this case, each display device in the display system 100 may establish a connection relationship with the control device 200 in the cloud by using a same user account. This is not limited in this embodiment of this application.

In addition, in the foregoing embodiment, an example in which the target service of the display device is projected to another display device for display is used for description. It may be understood that a terminal connected to the control device 200 in the display system 100 may alternatively be a terminal having another output function, for example, a Bluetooth speaker having an audio output function. In this case, when receiving a to-be-played audio service initiated by any terminal, the control device 200 may intelligently select a proper audio playing device for the terminal to perform the to-be-played audio service. This is not limited in this embodiment of this application.

In some embodiments of this application, the display device (or the control device 200) in the display system 100 may specifically be any terminal such as a mobile phone, a wearable device, an augmented reality (augmented reality, AR)/virtual reality (virtual reality, VR) device, a tablet computer, a notebook computer, an ultra-mobile personal computer (ultra-mobile personal computer, UMPC), a netbook, or a personal digital assistant (personal digital assistant, PDA). Certainly, a specific form of the terminal is not limited in the following embodiments.

Figure 9:
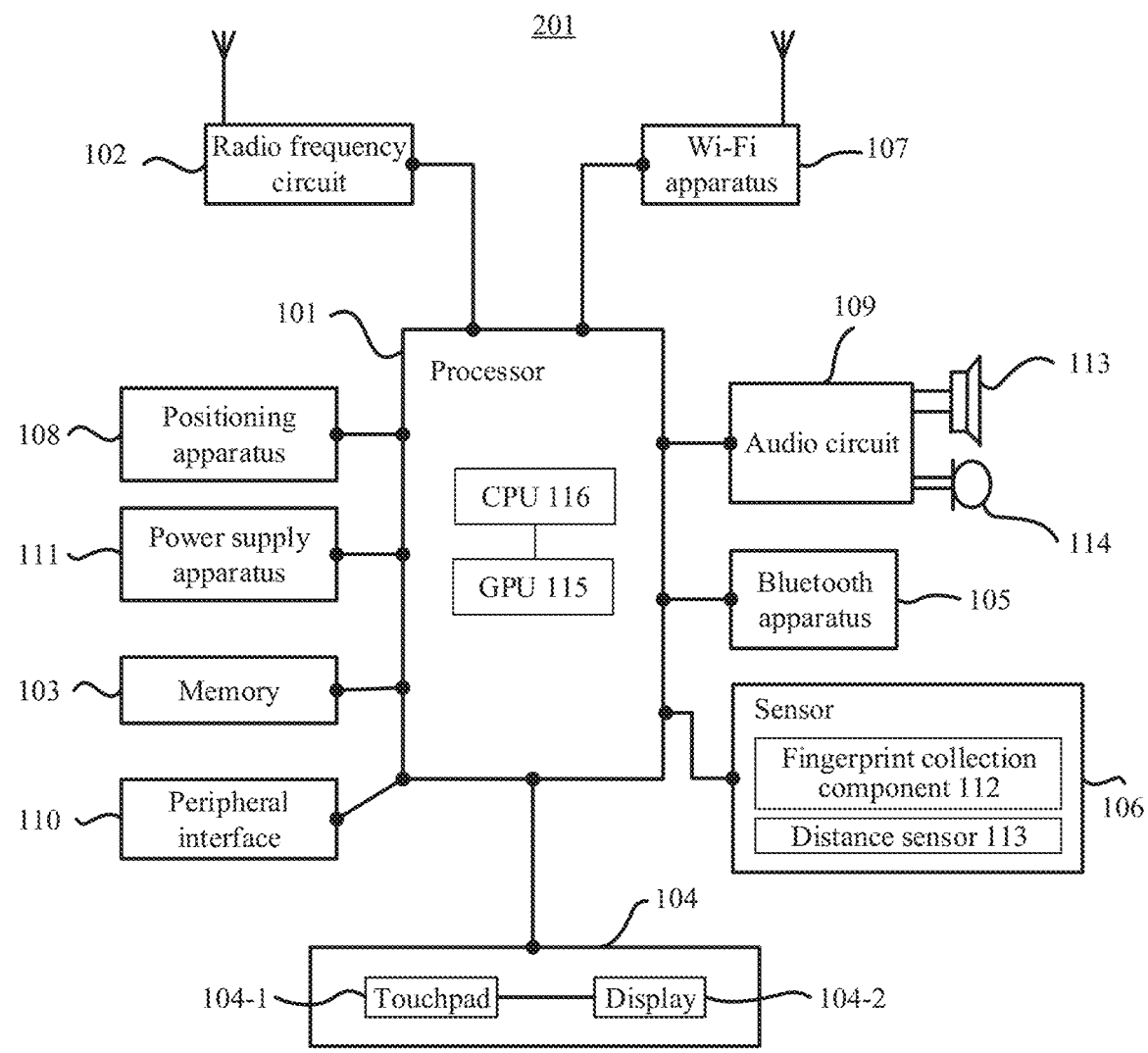
FIG. 9 is a schematic structural diagram of a mobile phone according to an embodiment of this application.

As shown in FIG. 9, the following specifically describes an embodiment by using an example in which a mobile phone 201 is used as a display device in a display system 100. It should be understood that the mobile phone 201 shown in the figure is merely an example of the foregoing terminal, and the mobile phone 201 may have more or fewer components than those shown in the figure and may combine two or more components or have different component configurations.

As shown in FIG. 9, the mobile phone 201 may specifically include parts such as a processor 101, a radio frequency (radio frequency, RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power system 111. These parts may perform communication by using one or more communications buses or signal cables (not shown in FIG. 9). A person skilled in the art may understand that a hardware structure shown in FIG. 9 does not constitute a limitation on the mobile phone, and the mobile phone 201 may include more or fewer components than those shown in the figure, or combine some parts, or have different part arrangements.

The parts of the mobile phone 201 are described in detail below with reference to FIG. 9.

The processor 101 is a control center of the mobile phone 201. The processor 101 is connected to the parts of the mobile phone 201 by using various interfaces and lines, and performs various functions of the mobile phone 201 and processes data by running or executing an application program stored in the memory 103 and invoking data stored in the memory 103. In some embodiments, the processor 101 may include one or more processing units. Optionally, an application processor and a modem processor may be integrated into the processor 101. The application processor mainly processes an operating system, a user interface, an application program, and the like, and the modem processor mainly processes wireless communication. Optionally, the modem processor and the application processor may alternatively be independent of each other.

In this embodiment of this application, the processor 101 may include a GPU 115 and a CPU 116, or may be a combination of a GPU 115, a CPU 116, a digital signal processing (digital signal processing, DSP), and a control chip (for example, a baseband chip) in a communications unit. In an implementation of this application, the GPU 115 and the CPU 116 each may be a single computing core, or may include a plurality of computing cores.

The GPU 115 is a microprocessor specially used for performing image computing on a personal computer, a workstation, a game console, and some mobile devices (such as a tablet computer and a smartphone). The GPU 115 may convert and drive display information required by the mobile phone 201, provides a row scanning signal to a display 104-2, and control correct display of the display 104-2.

Specifically, in a display process, the GPU 115 may send a corresponding drawing command to the GPU 115. For example, the drawing command may be "draw a rectangle with a length and width of a and b respectively at a coordinate position (x, y)". In this case, the GPU 115 may quickly calculate all pixels of the graphic according to the drawing instruction, and draw the corresponding graphic at the specified position on the display 104-2.

It should be noted that the GPU 115 may be integrated in the processor 101 in a form of a function module, or may be disposed in the mobile phone 201 in an independent entity form (for example, a video card). This is not limited in this embodiment of this application.

The radio frequency circuit 102 may be configured to receive and send a radio signal in an information receiving and sending process or in a call process. Particularly, after receiving downlink data from a base station, the radio frequency circuit 102 may send the downlink data to the processor 101 for processing. In addition, the radio frequency circuit 102 sends related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communication standard or protocol that includes but is not limited to a global system for mobile communications, a general packet radio service, code division multiple access, wideband code division multiple access, long term evolution, an email, a short message service, and the like.

The memory 103 is configured to store an application program and data. The processor 101 performs various functions of the mobile phone 201 and processes data by running the application program and the data stored in the memory 103. The memory 103 mainly includes a program storage area and a data storage area. The program storage area may store an operating system, and an application program required by at least one function (for example, a sound play function or an image play function). The data storage area may store data (for example, audio data or a phone book) created based on use of the mobile phone 201. In addition, the memory 103 may include a high-speed random access memory (random access memory, RAM), or may include a non-volatile memory such as a magnetic disk storage device, a flash storage device, or another volatile solid-state storage device. The memory 103 may store various operating systems such as an iOS®, operating system developed by Apple and an Android® operating system developed by Google. The memory 103 may be independent, and is connected to the processor 101 by using the communications bus. Alternatively, the memory 103 may be integrated into the processor 101.

The touchscreen 104 may specifically include a touchpad 104-1 and the display 104-2.

The touchpad 104-1 may collect a touch event (for example, an operation performed by a user on or near the touchpad 104-1 by using any proper object such as a finger or a stylus) performed by the user of the mobile phone 201 on or near the touchpad 104-1, and send collected touch information to another component (for example, the processor 101). The touch event performed by the user near the touchpad 104-1 may be referred to as a floating touch. The floating touch may mean that the user does not need to directly touch the touchpad for selecting, moving, or dragging a target (for example, an icon), and the user only needs to be near the terminal to perform a desired function. In addition, the touchpad 104-1 may be implemented in a plurality of types such as a resistive type, a capacitive type, an infrared type, or a surface acoustic wave type.

The display (also referred to as a display screen) 104-2 may be configured to display information entered by the user or information provided for the user, and various menus of the mobile phone 201. The display 104-2 can be configured in a form of a liquid crystal display, an organic light emitting diode, or the like. The touchpad 104-1 may cover the display 104-2. When detecting the touch event on or near the touchpad 104-1, the touchpad 104-1 transfers the touch event to the processor 101 to determine a type of the touch event. Then, the processor 101 can provide a corresponding visual output on the display 104-2 based on the type of the touch event. Although the touchpad 104-1 and the display screen 104-2 in FIG. 9 are used as two independent parts to implement input and output functions of the mobile phone 201, in some embodiments, the touchpad 104-1 and the display screen 104-2 may be integrated to implement the input and output functions of the mobile phone 201. It may be understood that the touchscreen 104 is formed by stacking layers of materials. In this embodiment of this application, only the touchpad (layer) and the display screen (layer) are displayed, and another layer is not described in this embodiment of this application. In addition, the touchpad 104-1 may be disposed on a front facet of the mobile phone 201 in a full panel form, and the display 104-2 may also be disposed on the front facet of the mobile phone 201 in the full panel form, so that a frameless structure of the front facet of the mobile phone can be implemented.

The mobile phone 201 may further include the Bluetooth apparatus 105, configured to exchange data between the mobile phone 201 and another terminal (for example, a mobile phone or a smartwatch) at a short distance away from the mobile phone 201. In this embodiment of this application, the Bluetooth apparatus may be an integrated circuit, a Bluetooth chip, or the like.

The mobile phone 201 may further include at least one sensor 106 such as a fingerprint collection component 112, a light sensor, a motion sensor, and another sensor. Specifically, the fingerprint collection component 112 may be disposed on a back facet (for example, under a rear-facing camera) of the mobile phone 201, or on the front facet (for example, under the touchscreen 104) of the mobile phone 201. For another example, the fingerprint collection component 112 may alternatively be configured in the touchscreen 104 to implement a fingerprint recognition function. In other words, the fingerprint collection component 112 may be integrated with the touchscreen 104 to implement the fingerprint recognition function of the mobile phone 201. The light sensor may include an ambient light sensor and a proximity sensor. The ambient light sensor may adjust luminance of the display of the touchscreen 104 based on ambient light luminance. The proximity sensor may power off the display when the mobile phone 201 approaches to an ear. As a motion sensor, an accelerometer sensor can detect a value of acceleration in each direction (usually, three axes), can detect a value and a direction of gravity in a static state, and can be used in an application for identifying a mobile phone posture (such as screen switching between a landscape mode and a portrait mode, a related game, and magnetometer posture calibration), a function related to vibration identification (such as a pedometer and a knock), and the like. Other sensors such as a gyroscope, a barometer, a hygrometer, a thermometer, and an infrared sensor may also be disposed in the mobile phone 201. Details are not described herein.

In this embodiment of this application, the sensor 106 of the mobile phone 201 further includes a distance sensor 113, configured to sense a distance between the mobile phone 201 and an object (or the user) to complete a preset function. According to different working principles, the distance sensor may be classified into an optical distance sensor, an infrared distance sensor, an ultrasonic distance sensor, or the like. This is not limited in this embodiment of this application.

The Wi-Fi apparatus 107 is configured to provide, for the mobile phone 201, network access that complies with a Wi-Fi-related standard protocol. The mobile phone 201 may access a Wi-Fi access point by using the Wi-Fi apparatus 107, to help the user receive and send an email, browse a web page, access streaming media, and the like. The Wi-Fi apparatus 107 provides a wireless broadband internet access for the user. In some other embodiments, the Wi-Fi apparatus 107 may alternatively be used as a Wi-Fi wireless access point, and may provide another terminal with Wi-Fi network access.

The positioning apparatus 108 is configured to provide a geographic location for the mobile phone 201. It may be understood that the positioning apparatus 108 may specifically be a receiver of a positioning system such as a global positioning system (GPS), the Beidou navigation satellite system, or the GLONASS of Russia. After receiving the geographic location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (AGPS). The AGPS system serves as an assisted server to assist the positioning apparatus 108 in completing ranging and positioning services. In this case, the assisted positioning server communicates with a terminal, for example, the positioning apparatus 108 (namely, the GPS receiver) of the mobile phone 201, through a wireless communications network, to provide positioning assistance. In some other embodiments, the positioning apparatus 108 may alternatively be a positioning technology based on a Wi-Fi access point. Each Wi-Fi access point has a globally unique media access control (media access control, MAC) address. The terminal can scan and collect a broadcast signal of a surrounding Wi-Fi access point when Wi-Fi is enabled. Therefore, the terminal can obtain a MAC address broadcast by the Wi-Fi access point. The terminal sends such data (for example, the MAC address) that can identify the Wi-Fi access point to a location server by using the wireless communications network. The location server retrieves a geographic location of each Wi-Fi access point, calculates a geographic location of the terminal with reference to strength of the Wi-Fi broadcast signal, and sends the geographic location of the terminal to the positioning apparatus 108 of the terminal.

The audio circuit 109, a speaker 113, and a microphone 114 may provide audio interfaces between the user and the mobile phone 201. The audio circuit 109 may transmit, to the speaker 113, an electrical signal converted from received audio data, and the speaker 113 converts the electrical signal into a sound signal for output. In addition, the microphone 114 converts a collected sound signal into an electrical signal, and the audio frequency circuit 109 converts the electrical signal into audio data after receiving the electrical signal, and then outputs the audio data to the RF circuit 102 to send the audio data to, for example, another mobile phone, or outputs the audio data to the memory 103 for further processing.

The peripheral interface 110 is configured to provide various interfaces for external input/output devices (such as a keyboard, a mouse, an external display, an external memory, and a subscriber identity module card). For example, the mouse is connected by using a universal serial bus (universal serial bus, USB) interface, and the subscriber identity module (subscriber identification module, SIM) card provided by a telecommunications operator is connected by using a metal contact on a card slot of the subscriber identity module card. The peripheral interface 110 may be configured to couple the external input/output peripheral devices to the processor 101 and the memory 103.

The mobile phone 201 may further include the power supply apparatus 111 (for example, a battery and a power management IC) that supplies power to the parts. The battery may be logically connected to the processor 101 by using the power management IC, so that functions such as charging management, discharging management, and power consumption management are implemented by using the power supply apparatus 111.

Although not shown in FIG. 9, the mobile phone 201 may further include a camera (a front-facing camera and/or the rear-facing camera), a flashlight, a micro projection apparatus, a near field communication (near field communication, NFC) apparatus, and the like. Details are not described herein.

Figures 8A, 8B, 8C:
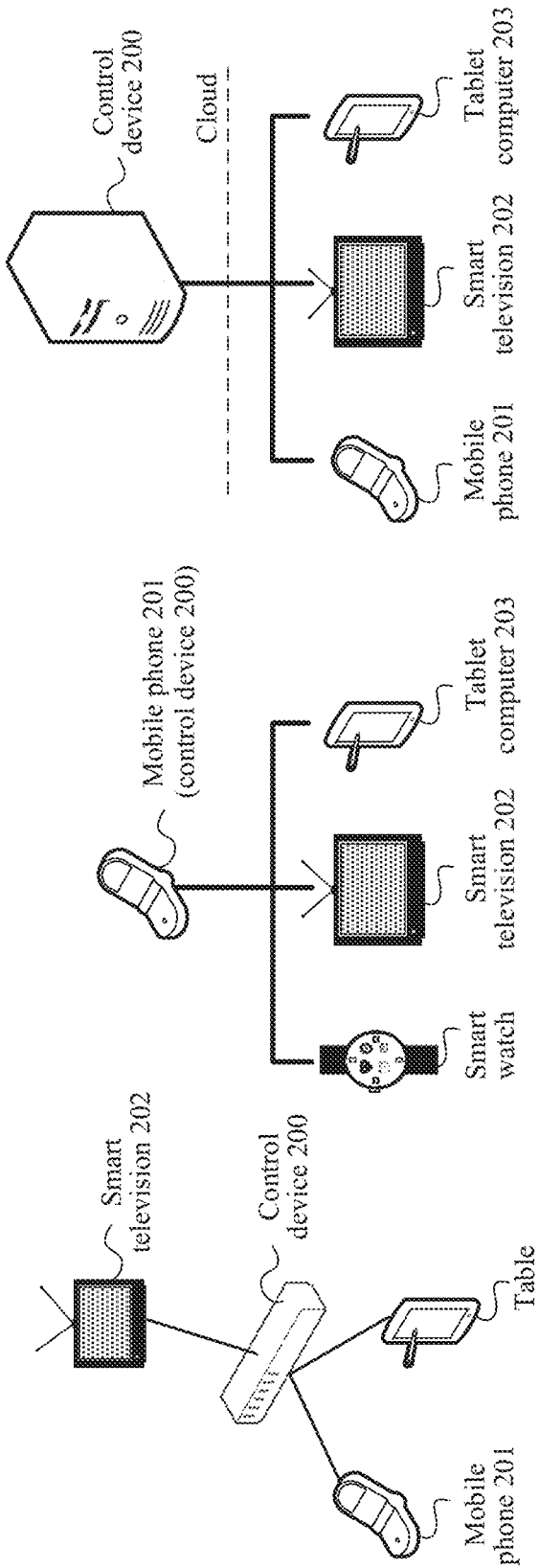
FIG. 8(a), FIG. 8(b) and FIG. 8(c) are a schematic structural diagram of a display system according to an embodiment of this application.
Figure 10:
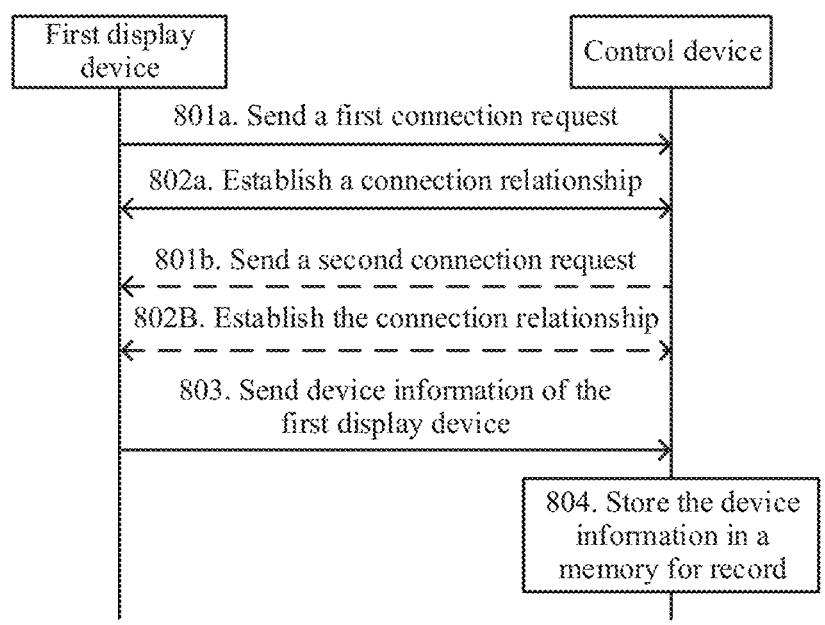
FIG. 10 is a schematic flowchart 1 of a display method according to an embodiment of this application.

With reference to the display system 100 shown in FIG. 1 to FIG. 8(*a*), FIG. 8(*b*) and FIG. 8(*c*) and the mobile phone 201 shown in FIG. 9, in an embodiment of this application, a networking method of the display system 100 is shown in FIG. 10, and includes the following steps.

801*a*. A first display device sends a first connection request to a control device.

802*a*. After receiving the first connection request, the control device establishes a connection relationship with the first display device.

In steps 801*a* and 802*a*, an example in which the first display device (for example, the foregoing mobile phone 201) actively establishes a connection to the control device is used for description.

In some embodiments of this application, after the control device 200 accesses a network, for example, a local area network whose Wi-Fi name is "1234", the control device 200 may add an identifier (for example, a MAC address of the control device 200) of the control device 200 to first indication information for periodic broadcast. The first indication information is used to indicate that the device is the control device 200. In this case, after the mobile phone 201 also accesses the local area network whose Wi-Fi name is "1234", the mobile phone 201 may receive the first indication information, to determine the current control device 200.

Then, as described in step 801*a*, a processor of the mobile phone 201 may invoke, based on the identifier of the control device 200, a Wi-Fi apparatus of the mobile phone 201 to send the first connection request to the control device 200 by using the Wi-Fi network named "1234". The first connection request is used to request to establish the connection relationship between the mobile phone 201 and the control device 200, and the first connection request may carry an identifier of the mobile phone 201 (for example, a MAC address of the mobile phone 201).

In this case, after the control device 200 receives the first connection request sent by the mobile phone 201, as described in step 802*a*, the control device 200 may store the identifier of the mobile phone 201 in a memory, to establish the connection relationship with the mobile phone 201. Subsequently, both the control device 200 and the mobile phone 201 can find each other by using the identifier of the control device 200 and the identifier of the mobile phone 201, to perform communication.

Figure 11:
FIG. 11 is a schematic diagram 1 of an application scenario of a display method according to an embodiment of this application.

In some other embodiments of this application, after the mobile phone 201 and a plurality of other devices access a same network (for example, the local area network whose Wi-Fi name is "1234"), as shown in FIG. 11, a candidate control device list 1001 may be displayed in a display interface of the mobile phone 201. The user selects a control device in the local area network. For example, the user taps "My phone", namely, the mobile phone 201, in the candidate control device list 1001.

In this case, after detecting this entry operation of the user, the mobile phone 201 can set the mobile phone 201 as the control device 200, and add the identifier of the mobile phone 201 to the first indication information for periodic broadcast. In this case, after receiving the first indication information, another display device in the local area network may add an identifier of the display device to the first connection request, and send the first connection request to the mobile phone 201 (namely, the control device), so that the mobile phone 201 stores the received identifier, to establish a connection relationship with each display device in the local area network.

801*b*. The control device sends a second connection request to the first display device.

802*b*. After receiving the second connection request, the first display device establishes the connection relationship with the control device.

In steps 801*b* and 802*b*, an example in which the control device actively establishes a connection to the first display device (namely, the mobile phone 201) is used for description.

Similar to the foregoing steps 801*a* and 802*a*, the control device 200 can add the identifier of the control device 200 to the second connection request, and send the second connection request to the mobile phone 201. In this case, after receiving the second connection request, the mobile phone may store the identifier of the control device 200, and send the identifier of the mobile phone 201 to the control device 200, so that the control device 200 also stores the identifier of the mobile phone 201 in the memory of the control device, to establish the connection relationship with the mobile phone 201. Subsequently, both the control device 200 and the mobile phone 201 can find each other by using the identifier of the control device 200 and the identifier of the mobile phone 201, to perform communication.

It should be noted that, in the foregoing embodiments, an example in which the first display device establishes the connection relationship with the control device is used for description. Another display device may also establish a connection relationship with the control device based on the foregoing method, to build the display systems 100 shown in FIG. 1 to FIG. 8(*a*), FIG. 8(*b*) and FIG. 8(*c*).

803. The first display device sends device information of the first display device to the control device.

804. After receiving the device information, the control device stores the device information in the memory of the control device for recording.

That the mobile phone 201 is used as the first display device is still used as an example. In step 803, because the mobile phone 201 has established the connection relationship with the control device, the mobile phone 201 may send the device information of the mobile phone 201 to the control device based on the stored identifier of the control device 200, for example, a parameter reflecting a display capability of the mobile phone 201 such as screen resolution of the mobile phone 201, a rendering capability of a GPU, and a frequency of a CPU, a parameter reflecting an audio playing capability such as an audio format supported by the mobile phone 201, and a parameter reflecting whether display of user privacy is supported. This is not limited in this embodiment of this application.

The user privacy may specifically include information such as secure transaction information (for example, a stock transaction page), information having a chat nature (for example, an SMS message or a message notification), location information of the user, and information, such as a contact number, that cannot be disclosed by the user forever.

For example, whether the display device supports display of the user privacy may be determined based on a parameter such as a type of the display device and/or a geographical location of the display device. For example, when the display device is a device with strong mobility, for example, a mobile phone or a wearable device, because the user usually carries such a device, in other words, privacy of the device is relatively high, it may be determined that the device supports display of the user privacy. When the display device is a device with weak mobility, for example, a Bluetooth speaker or a smart television, because a location of such device is relatively fixed and the device usually cannot be moved with movement of the user, in other words, privacy of the device is relatively low, therefore, it may be determined that the device does not support display of the user privacy.

Then, in step 804, after receiving the device information sent by the mobile phone 201, the control device 200 may store a correspondence between the mobile phone 201 and the device information of the mobile phone 201 in the memory of the control device 200 for recording.

The control device 200 may record received device information of each display device. As shown in Table 1, the device information of each display device is maintained in the control device 200. Subsequently, when a target service needs to be displayed, the control device 200 may determine, for the target service and based on the recorded device information of each display device, a proper display device as a target device for displaying the target service.

TABLE 1

| | Device information | | | | |
|---|---|---|---|---|---|
| | | Display capability | | Playing capability | Support privacy |
| Display device | Resolution | CPU capability | GPU capability | Supported format | display or not |
| Mobile phone 201 | 1920 × 1080 | Strong | Strong | MP3 and WAV | Yes |
| Smart television 202 | 3840 × 2160 | Weak | Weak | MP3 | No |
| Tablet computer 203 | 2560 × 1440 | Strong | Middle | MP3 and WAV | Yes |

For example, after receiving an incoming call service, the mobile phone 201 may send, to the control device 200, attribute information of attributes of one or more to-be-displayed layers related to the incoming call service, for example, resolution supported by the to-be-displayed layer, a CPU capability and a GPU capability that are supported by the to-be-displayed layer, and whether user privacy is included in the to-be-displayed layer. The control device 200 matches the received attribute information of the to-be-displayed layer with the device information of each display device recorded in Table 1, to obtain one or more display devices that support display of the to-be-displayed layer.

For example, the control device 200 determines that the mobile phone 201, the smart television 202, and the tablet computer 203 in Table 1 all support display of the to-be-displayed layer of the incoming call service. In this case, to facilitate the user to learn of the incoming call service in time, when the mobile phone 201, the smart television 202, and the tablet computer 203 all remain connected to the control device 200, the control device may send second instruction information to the mobile phone 201, the smart television 202, and the tablet computer 203. The second instruction information is used to instruct the display device to report a distance away from the user.

Then, after receiving the second instruction information, the mobile phone 201, the smart television 202, and the tablet computer 203 each may obtain the distance away from the user through periodic detection by a distance sensor (for example, a camera or an infrared sensor) of the mobile phone 201, the smart television 202, or the tablet computer 203 or in another existing manner, and report the distance obtained through detection to the control device 200. In this way, the control device 200 may determine a display device closest to the user, for example, the smart television 202 in the bedroom, as the target device for displaying the to-be-displayed layer of the incoming call service. In addition, the target device may be selected based on a real-time distance in a process of performing the incoming call service. In the process of performing the incoming call service, when the distances between the user and the plurality of display devices change, the incoming call service may be freely switched on the plurality of display devices, thereby improving efficiency of collaboration between the plurality of devices while greatly improving user experience.

Figure 12:
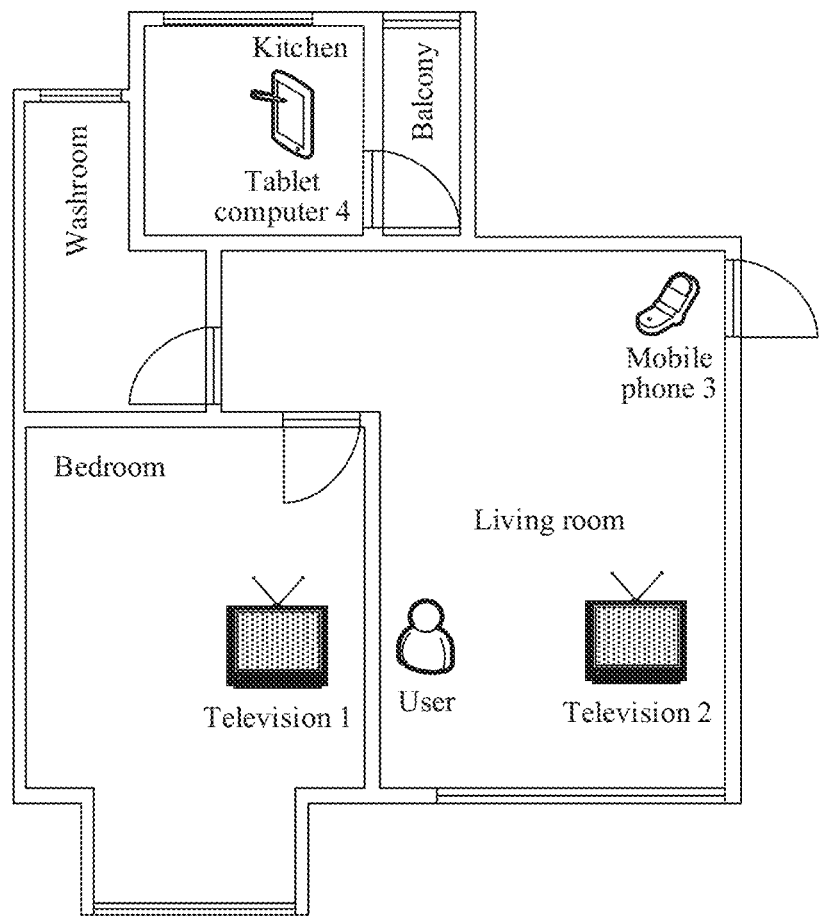
FIG. 12 is a schematic diagram 2 of an application scenario of a display method according to an embodiment of this application.

In this embodiment of this application, a house structure diagram showing a location of each display device may also be pre-stored in the control device 200. FIG. 12 is a schematic structural diagram of a house that includes a room and a hall and that is owned by the user. Each display device in the display system 100 may report location information of the display device to the control device 200 by using a positioning apparatus (for example, a GPS), and the control device may determine a specific location of each display device in the house of the user with reference to the schematic structural diagram shown in FIG. 12. As shown in FIG. 12, television 1 is placed in a bedroom, television 1 and mobile phone 3 are placed in a living room, and tablet computer 4 is placed in a kitchen.

In this case, when the control device 200 determines, based on the distance between the user and each display device, the target device displaying the target service, with reference to the specific location of each display device shown in FIG. 12, the control device 200 may determine a display device (for example, television 1 in the living room in FIG. 12) that is in a same room with the user and that is closest to the user as the target device, to avoid a problem that the user cannot process the target service in time because the target device determined for the user is not in the room where the user is located.

Figure 13:
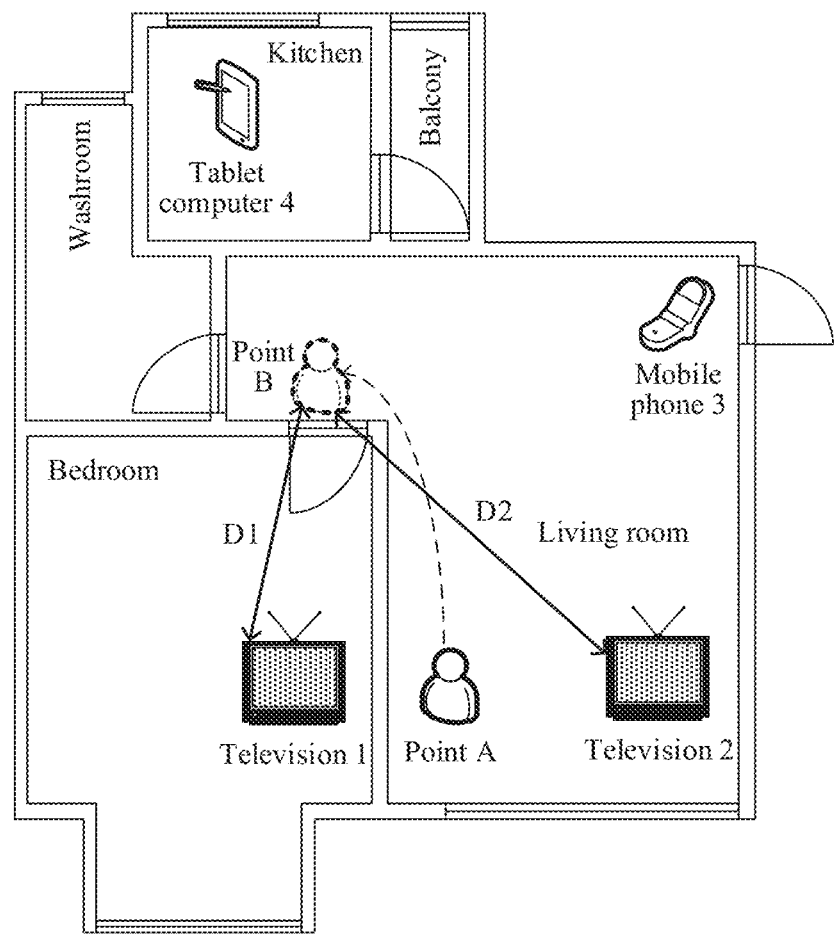
FIG. 13 is a schematic diagram 3 of an application scenario of a display method according to an embodiment of this application.

In addition, each display device in the rooms may further periodically report the distance between the user and the display device to the control device 200, for example, report the distance between the user and the display device every 30 seconds. Therefore, when the user moves in the rooms, for example, as shown in FIG. 13, when the user moves from point A in the living room to point B at a door of the bedroom, the control device may obtain the distance between the user and each display device in real time. When the distance D between the user and television 1 in the bedroom is less than the distance D2 between the user and television 2 in the living room, the target service may be dynamically switched from television 2 in the living room to television 1 that is in the bedroom and closest to the user.

However, when the control device 200 switches the target service from television 2 to television 1, the user may not enter the bedroom, or may not enter an optimal viewing area in the bedroom, and consequently, the user misses a related image of the target service.

Figure 14:
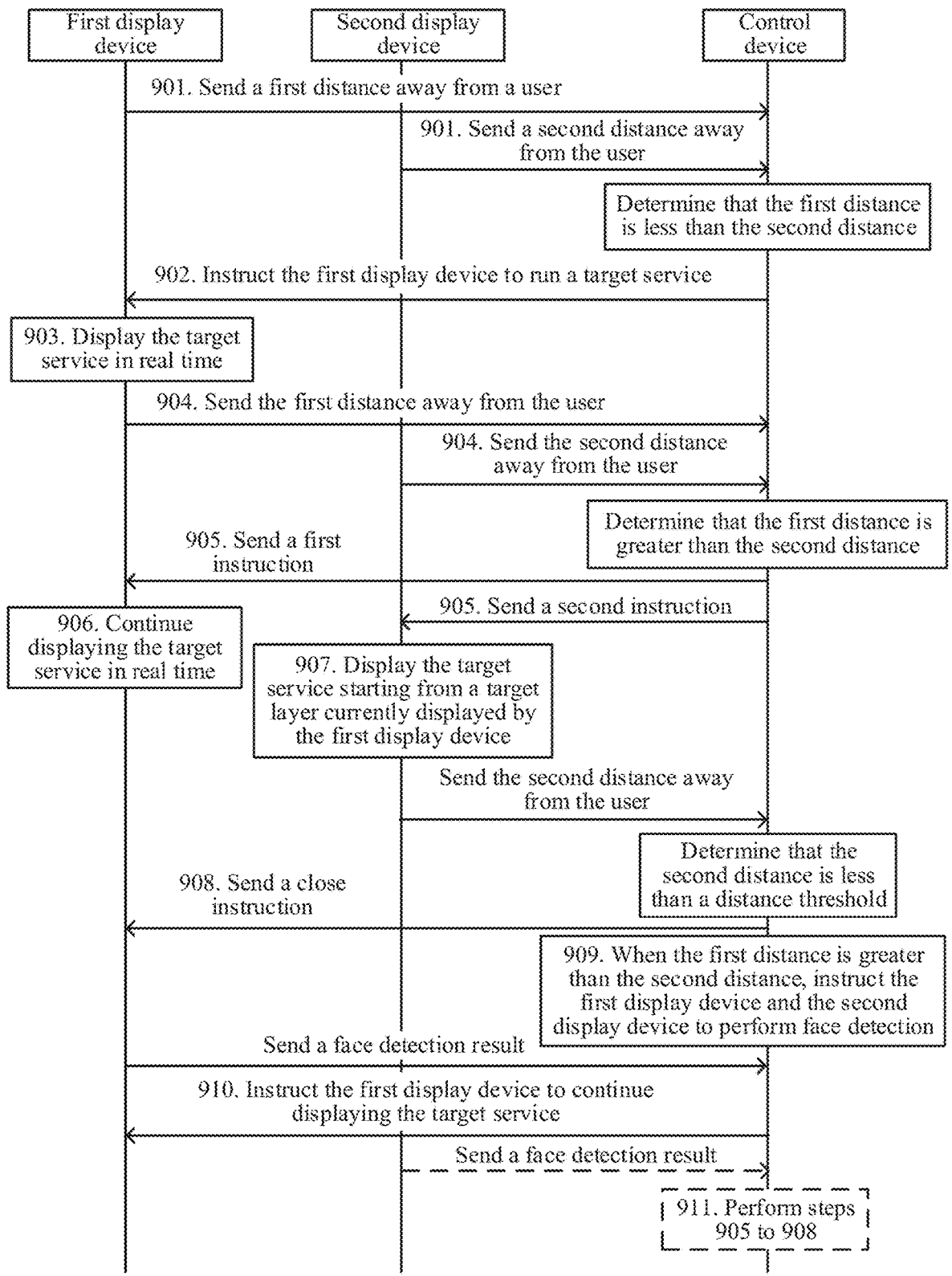
FIG. 14 is a schematic flowchart 2 of a display method according to an embodiment of this application.

Therefore, an embodiment of this application provides a display method. That the foregoing display system 100 includes a control device 200, and a first display device and a second display device that are connected to the control device 200 is used as an example. As shown in FIG. 14, the method includes the following steps.

901. The control device obtains a first distance between the first display device and a user, and a second distance between the second display device and the user.

Specifically, a distance sensor may be disposed in each of the first display device and the second display device. The first display device may measure the current first distance away from the user by using the distance sensor of the first display device, and the second display device may measure the current second distance away from the user by using the distance sensor of the second display device. Then, the first display device and the second display device may separately send the measured first distance and second distance to the control device.

Certainly, if the user is not within a ranging range of the first display device (or the second display device) at the moment, for example, the second display device does not detect the user in the bedroom, it may be considered that the distance between the second display device and the user is infinite.

Alternatively, one or more cameras connected to the control device may further be disposed in the display system 100, and the control device may capture a user image by using the camera. In this case, the first distance between the first display device and the user and the second distance between the second display device and the user may be determined in combination with a pre-stored location of each display device.

Certainly, because a wearable device (or a mobile phone) is usually carried by the user, the control device may further obtain a positioning result of the user by using a positioning apparatus of the wearable device (or the mobile phone), and then determine, in combination with the pre-stored locations of the display devices, the first distance between the first display device and the user and the second distance between the second display device and the user.

Optionally, the control device may alternatively obtain the first distance and the second distance in another existing manner such as by using indoor positioning. This is not limited in this embodiment of this application.

Figure 15:
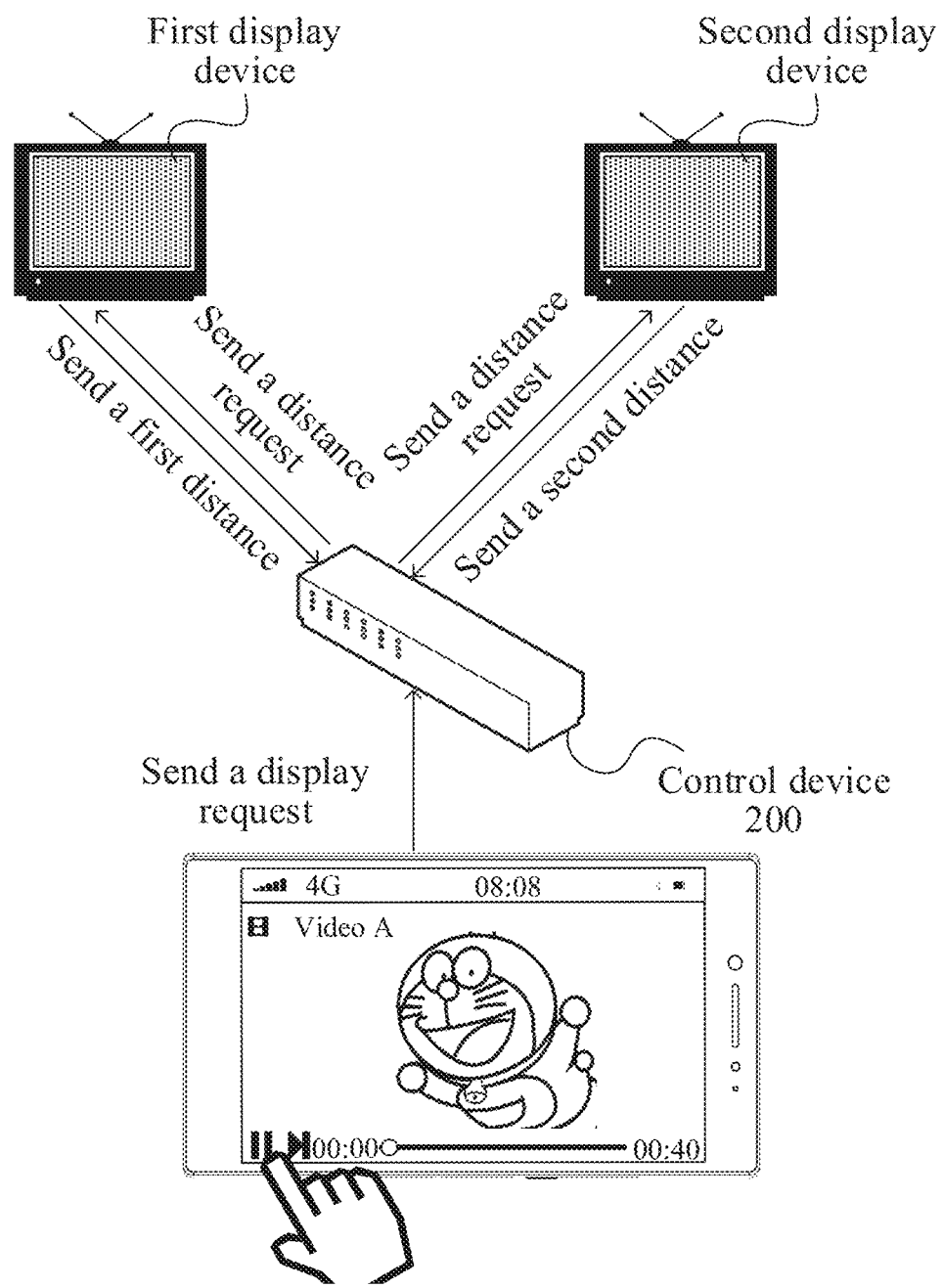
FIG. 15 is a schematic diagram 4 of an application scenario of a display method according to an embodiment of this application.

In some embodiments of this application, when the control device receives a display request initiated by a target service, the control device may be triggered to obtain the first distance and the second distance. For example, as shown in FIG. 15, when the user plays a video in a video play app on a mobile phone, the mobile phone may send a display request of a video playing service to the control device. After receiving the display request, the control device may first determine, based on the recorded device information of each display device in Table 1, a display device supporting the video playing service, for example, the first display device and the second display device. Then, the control device may send a distance request to the first display device and the second display device, to request the first display device to report the first distance between the first display device and the user, and request the second display device to report the second distance between the second display device and the user. After receiving the distance request, the first display device and the second display device may be triggered to periodically detect and report the distance between the first display device and the user and the distance between the second display device and the user.

Certainly, the mobile phone in FIG. 15 may also be used as the first display device or the second display device. This is not limited in this embodiment of this application.

902. When the first distance is less than the second distance, the control device instructs the first display device to run the target service.

903. The first display device displays the target service in real time.

Figure 16:
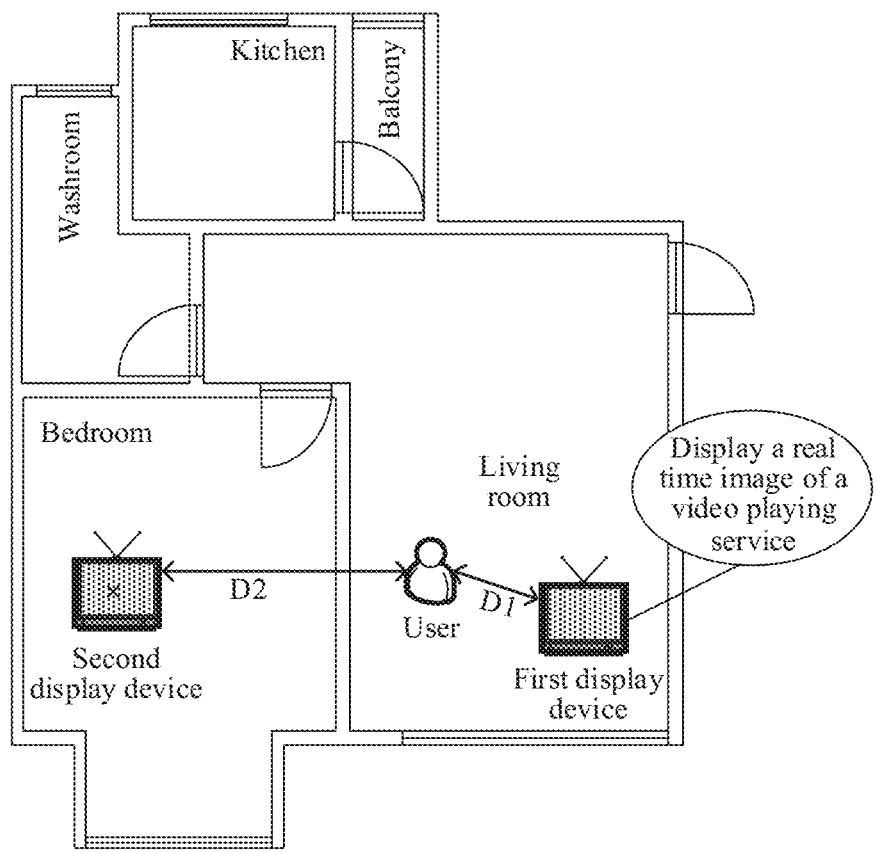
FIG. 16 is a schematic diagram 5 of an application scenario of a display method according to an embodiment of this application.

When the first distance D1 is less than the second distance D2, as shown in FIG. 16, it indicates that the first display device is closer to the user, and the foregoing video playing service is still used as an example. In this case, the control device may send, to the first display device in real time for display, a to-be-displayed layer generated when the mobile phone runs the video playing service, so that the first display device can display the to-be-displayed layer of the video playing service in real time.

The to-be-displayed layer may include some layers during running of the video playing service. For example, the control device may remove a layer that includes user privacy during running of the video playing service, and send, to the first display device, a layer that does not include privacy as the to-be-displayed layer. Alternatively, the control device may send, to a third display device that supports display of user privacy, a layer that includes user privacy during running of the video playing service, and send, to the first display device, a layer that does not include privacy as the to-be-displayed layer. Certainly, the to-be-displayed layer may alternatively include all layers during running of the video playing service. This is not limited in this embodiment of this application.

In addition, when the first distance D1 is less than the second distance D2, if the first distance is less than a preset value, for example, the distance between the user and the first display device is less than 3 meters (or another preset distance), or duration in which the distance between the user and the first display device is less than 3 meters (or another preset distance) is greater than preset duration, the control device may be triggered to instruct the first display device to run the target service, to avoid a problem that when the user quickly passes through the first display device, the first display device is triggered to display the target service, increasing power consumption of the first device.

Certainly, before the control device sends, to the first display device, the to-be-displayed layer generated when the mobile phone runs the video playing service, the control device may further perform secondary rendering on the to-be-displayed layer sent by the mobile phone, for example, adjust a size of the to-be-displayed layer to adapt to resolution of the first display device. This is not limited in this embodiment of this application.

904. The control device continues obtaining the first distance between the first display device and the user, and the second distance between the second display device and the user.

While the first display device displays a real-time image of the target service, the first display device and the second display device may continue detecting and reporting the distance between the first display device and the user and the distance between the second display device and the user, so that the control device continues obtaining the first distance D1 between the first display device and the user, and the second distance D2 between the second display device and the user.

905. When the first distance is greater than the second distance, the control device sends a first instruction to the first display device, and sends a second instruction to the second device.

The first instruction is used to instruct the first display device to continue displaying the target service in real time, and the second instruction is used to instruct the second display device to display the target service in real time starting from a target image currently displayed by the first display device.

In addition, before sending the second instruction to the second display device, the control device may first determine whether the second display device is currently in a connected mode to the control device, in other words, whether the second display device is online. When the second display device is online, the control device may be triggered to send the second instruction to the second display device.

However, when the second display device is offline, the control device may re-establish a connection relationship with the second display device, and then send the second instruction to the second display device. Alternatively, when the second display device is offline, the control device may reselect another display device that is currently closer to the user and that is in a connected mode to the control device, and send the second instruction to the display device. This is not limited in this embodiment of this application.

906. In response to the first instruction, the first display device continues displaying the target service in real time within the preset duration.

907. In response to the second instruction, the second display device displays the target service in real time starting from a target layer currently displayed by the first display device.

Figure 17:
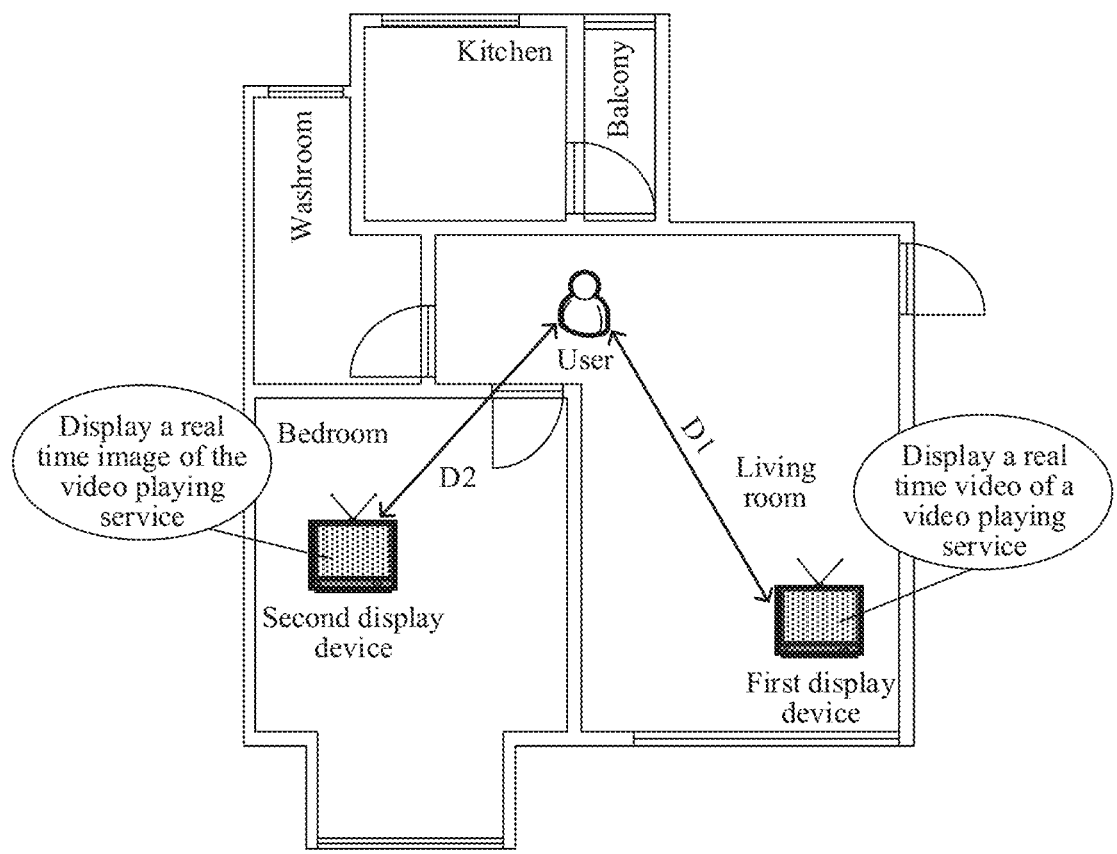
FIG. 17 is a schematic diagram 6 of an application scenario of a display method according to an embodiment of this application.

When the first distance D1 is greater than the second distance D2, as shown in FIG. 17, it indicates that the second display device is closer to the user in this case, and the user tends to move towards the second display device. The foregoing video playing service is still used as an example. When video A is played to 3 minutes and 45 seconds, the control device obtains that the first distance D1 reported by the first display device is greater than the second distance D2 reported by the second display device. In this case, the control device may send, to the second display device, the to-be-displayed layer generated when the mobile phone runs the video playing service, in other words, send the second instruction to the second display device. After receiving the second instruction, the second display device may continue to display the to-be-displayed layer of the video playing service starting from a display image (namely, the foregoing target layer) of video A at 3 minutes and 45 seconds.

It should be noted that the to-be-displayed layer generated when the second display device displays the target service may be the same as or different from the to-be-displayed layer generated when the first display device displays the target service. For example, when the second display device supports display of user privacy but the first display device does not support display of privacy, the to-be-displayed layer sent by the control device to the second display device may include a layer related to user privacy, for example, a layer including a contact number and SMS message content, but the to-be-displayed layer sent by the control device to the first display device does not include a layer related to user privacy.

For the first display device, the control device continues sending a to-be-displayed layer of video A after three minutes and 45 seconds to the first display device instead of immediately stopping sending the to-be-displayed layer of the video playing service to the first display device. In other words, when the control device switches the video playing service from the first display device to the second display device, the first display device and the second display device simultaneously display same images in a period of time.

A reason is that a process in which the user moves from the first display device to the second display device is a continuous process. When it is detected that the first distance D1 is greater than the second distance D2, still as shown in FIG. 17, the user may not enter the room in which the second display device is located in this case, or the user may not enter a viewing area of the second display device (for example, an area that is located three meters away from the second display device and in front of the second display device). In this case, if video A played by the first display device is closed, the user may miss a corresponding playing segment. In other words, seamless connection of the target service viewed by the user cannot be implemented between the first display device and the second device.

Therefore, when it is detected that the first distance D1 is greater than the second distance D2, in addition to switching the video playing service from the first display device to the second display device, the control device continues sending the to-be-displayed layer of the video playing service to the first display device, so that the first display device continues displaying the video playing service for a period of time (for example, 30 seconds). In this way, the user can still view the video playing service played in real time before leaving the room in which the first display device is located, thereby ensuring that the video playing service can be stably transited when being switched between different display devices. In addition, seamless connection of the video playing service on the different display devices is implemented, thereby improving efficiency of collaboration between the plurality of devices.

Further, to enable the first display device and the second display device to play the video playing service at the same time as much as possible, the control device may send the to-be-displayed layer of the target service to the first display device and the second display device at the same time. In this way, the first display device and the second display device may immediately display the to-be-displayed layer of the target service after receiving the to-be-displayed layer, thereby improving synchronization of playing the video playing service by the first display device and the second display device.

Alternatively, a synchronization mechanism may be preset between the display devices of the display system, so that system time of the first display device is synchronized with that of the second display device. In this case, the control device may add a display time point of the target service to the first instruction sent to the first display device and to the second instruction sent to the second display device. In this way, when the display time point arrives, the first display device and the second display device may be triggered to simultaneously play the target service, to improve synchronization of playing the video playing service by the first display device and the second display device.

908. When the control device obtains that the second distance between the second display device and the user is less than a distance threshold, the control device sends a close instruction to the first display device, to enable the first display device to stop displaying the target service.

Figure 18:
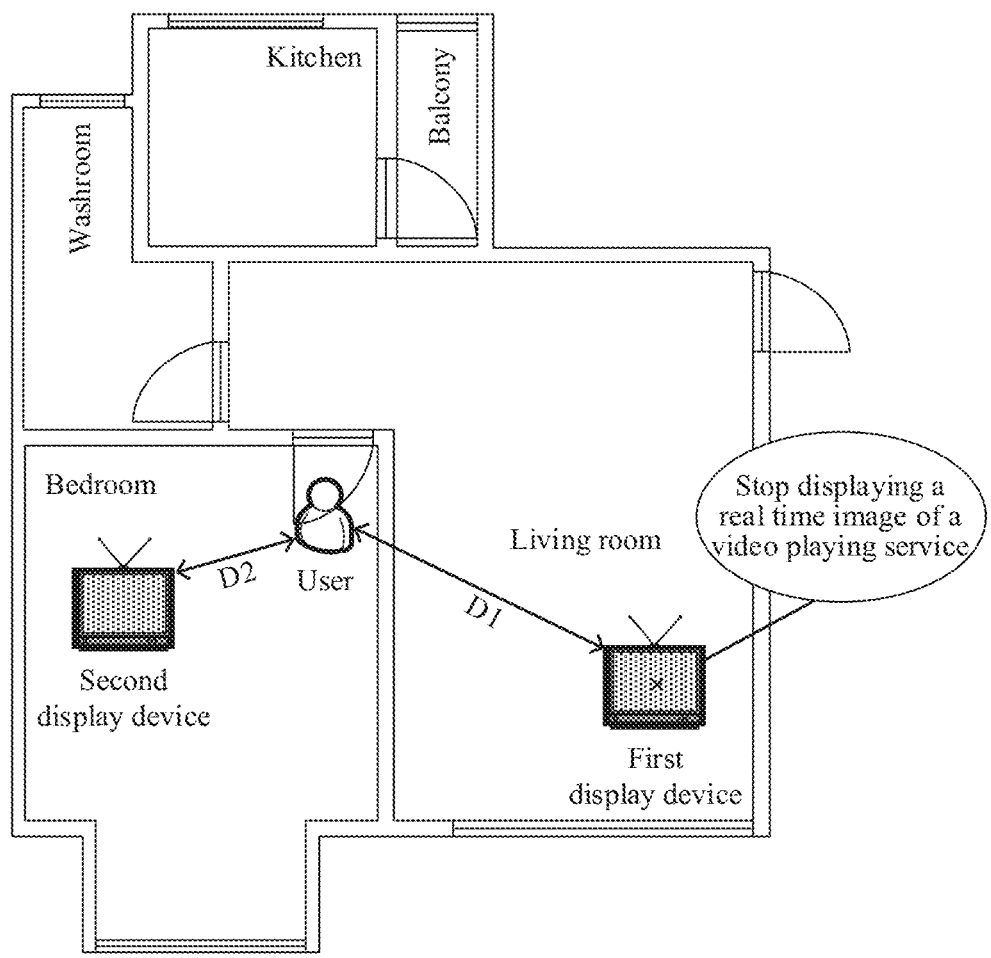
FIG. 18 is a schematic diagram 7 of an application scenario of a display method according to an embodiment of this application.

Optionally, in step 908, after switching the video playing service from the first display device to the second display device, the control device may further continue obtaining the second distance D2 between the user and the second display device. As shown in FIG. 18, when the second distance D2 between the second display device and the user is less than the distance threshold, for example, less than three meters, it indicates that a current focus of the user has been transferred to the second display device. In this case, the control device may stop sending the to-be-displayed layer of the video playing service to the first display device, so that the first display device stops displaying the video playing service (namely, the target service), to reduce power consumption of the first display device.

Further, the control device may determine duration in which the second distance between the second display device and the user is less than the threshold. If the duration is greater than a duration threshold, it indicates that the user has stayed in front of the second display device for a period of time. In this case, the control device may be triggered to send the close instruction to the first display device, to enable the first display device to stop displaying the target service.

In addition, if the first display device does not receive, within the preset duration, the to-be-displayed layer that is of the video playing service and that is sent by the control device, the first display device may stop sending the first distance between the first display device and the user to the control device, to reduce power consumption of the first display device.

Certainly, after the control device stops sending the to-be-displayed layer of the video playing service to the first display device, the first display device may still continue periodically sending the first distance between the first display device and the user to the control device, so that in a subsequent movement process of the user, the control device may determine in time, based on the first distance, whether to switch the video playing service to the first display device until the control device sends an instruction for stopping reporting the first distance to the first display device. This is not limited in this embodiment of this application.

In addition, after step 904, if the control device obtains that the first distance is equal to the second distance, in other words, the distance between the user and the first display device is equal to the distance between the user and the second display device, still as shown in FIG. 14, the method further includes steps 909 and 910.

909. The first display device and the second display device separately perform face detection (or human eye detection).

When the first distance is equal to the second distance, the control device may determine the current focus of the user based on an orientation of a face (or an eye) of the user, and further determine whether to switch the video playing service from the first display device to the second display device.

Specifically, a camera may be disposed on each of the first display device and the second display device. In this way, the first display device and the second display device each may capture an image of the user by using the camera, and further recognize the image of the user based on a face detection (or human eye detection) algorithm. When the face (or the human eye) is recognized, it indicates that a face detection (or human eye detection) result is obtained in this case.

910. If the first display device obtains the face detection (or human eye detection) result, the control device instructs the first display device to continue displaying the target service.

If the first display device obtains the face detection (or human eye detection) result, it indicates that the current focus of the user still falls on the first display device in this case, and the control device may continue sending, to the first display device, the to-be-displayed layer that is generated in real time by the video playing service, and does not need to switch the video playing service from the first display device to the second display device.

In this embodiment of this application, the first display device and the second display device may alternatively periodically capture images of the user by using the cameras. In this case, in step 910, when the first display device obtains the face detection (or human eye detection) result, the control device may further identify, by using a face (or human eyes) identification algorithm, whether a face (or a human eye) detected in current detection is the same as the face (or the human eye) detected in previous face detection (or human eye detection). If the face (or the human eye) detected in the current detection is the same as the face (or the human eye) detected in the previous face detection (or human eye detection), it indicates that the user focusing on the first display device does not change, and the control device may instruct the first display device to continue displaying the foregoing target service. Otherwise, the control device may ignore a face detection (or human eye detection) result reported by the first display device in the current detection.

911. If the second display device obtains the face detection (or human eye detection) result, the control device performs the foregoing steps 905 to 908.

If the second display device obtains a face detection (or human eye detection) result, it indicates that the current focus of the user has been transferred to the second display device. In this case, the control device may switch the video playing service from the first display device to the second display device. For a specific switching method of the video playing service, refer to related descriptions in steps 905 to 908, and details are not described herein again.

Similar to step 910, when the second display device obtains the face detection (or human eye detection) result, the control device may further identify, by using the face (or human eye) identification algorithm, whether a currently detected face (or human eye) is the same as a face (or human eye) that is previously reported by the first display device. If the currently detected face (or human eye) is the same as the face (or human eye) that is previously reported by the first display device, it indicates that the user originally focusing on the first display device transfers the focus to the second display device. Then, the control device may switch the video playing service from the first display device to the second display device by performing the foregoing steps 905 to 908. Otherwise, the control device may ignore the face detection (or human eye detection) result reported by the second display device this time.

Certainly, the user may also manually switch the target service from the first display device to the second display device.

Figure 19:
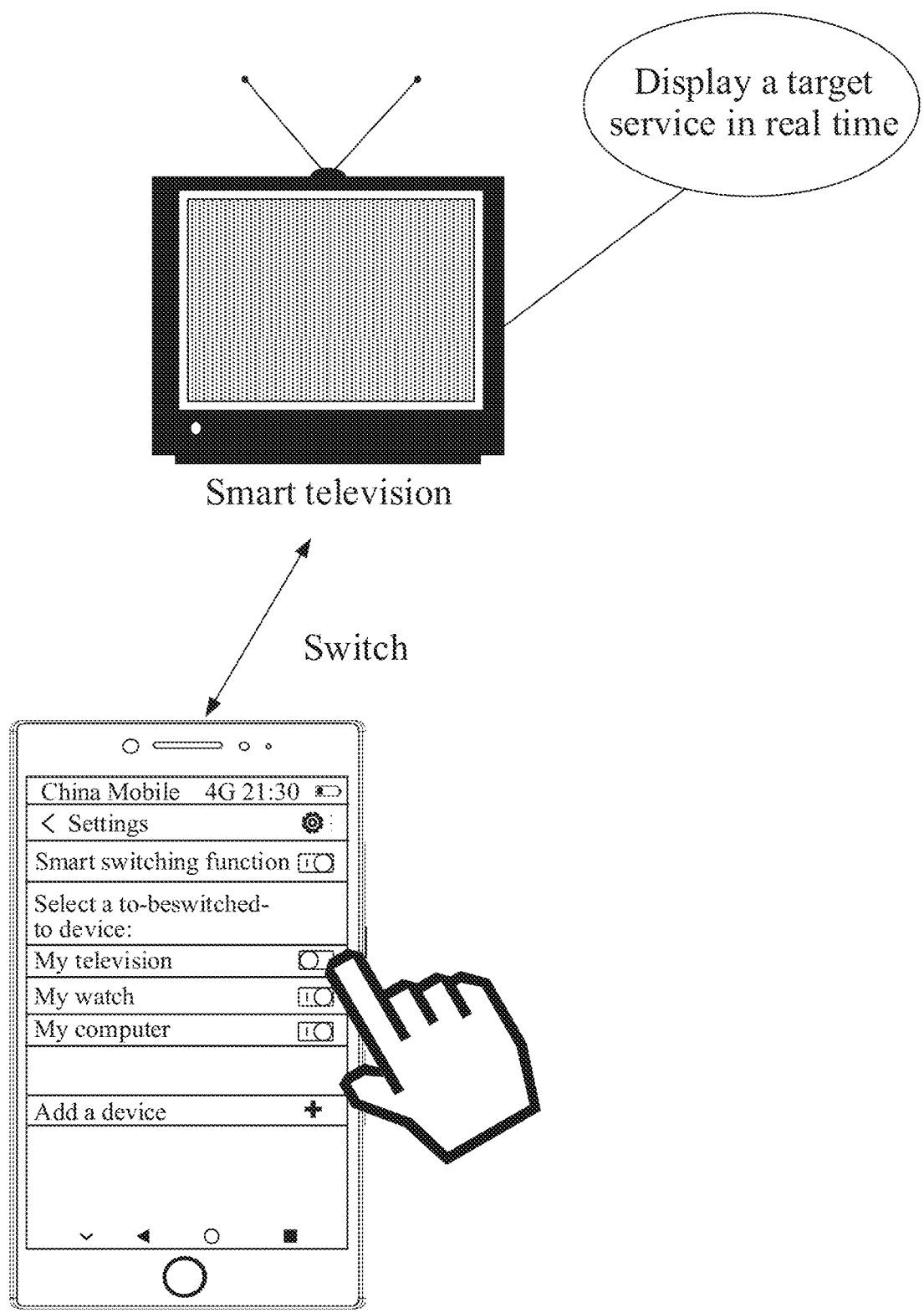
FIG. 19 is a schematic diagram 8 of an application scenario of a display method according to an embodiment of this application.

For example, as shown in FIG. 19, the user may select a switched second display device (for example, a smart television) on a setting interface of the first display device. After detecting the selection operation of the user, the first display device may add an identifier of the second display device to a switching request and send the switching request to the control device. Then, the control device may switch the target service from the first display device to the second display device according to the switching method in the foregoing steps 905 to 908.

Figure 20:
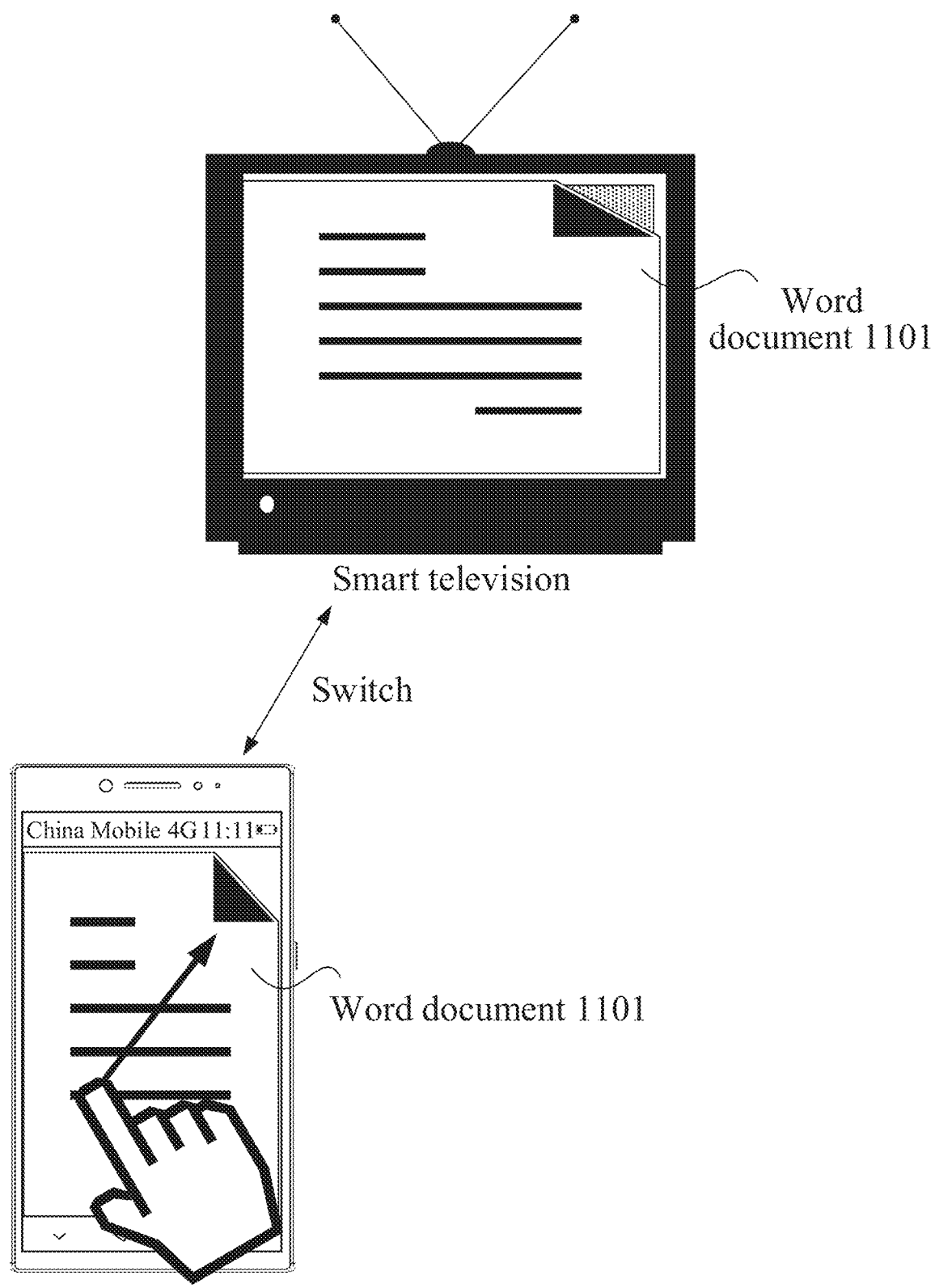
FIG. 20 is a schematic diagram 9 of an application scenario of a display method according to an embodiment of this application.

For another example, the user may further trigger a switching process of the target service by performing a corresponding gesture on the first display device. As shown in FIG. 20, the mobile phone (the first display device) is displaying a word document 1101. The mobile phone may determine a relative position relationship between the mobile phone and the smart television (the second display device) by using a camera of the mobile phone. If the mobile phone detects that the user performs a drag operation on a current display interface of the word document 1101, the mobile phone may determine directivity of the drag operation based on a moving track of the drag operation on a touchscreen and the relative position relationship between the mobile phone and the smart television. When the drag operation points to the smart television, the mobile phone may add an identifier of the smart television to the switching request and send the switching request to the control device. Then, the control device may switch the word document 1101 from the mobile phone to the smart television according to the switching method described in steps 905 to 908, to continue displaying the word document 1101.

Optionally, the mobile phone may further display the determined relative position relationship between the mobile phone and the smart television on a display screen of the mobile phone in a form of a text, a picture, an animation, or the like, to prompt the user to switch the target service between the mobile phone and the smart television by performing a directional drag operation.

Figure 21:
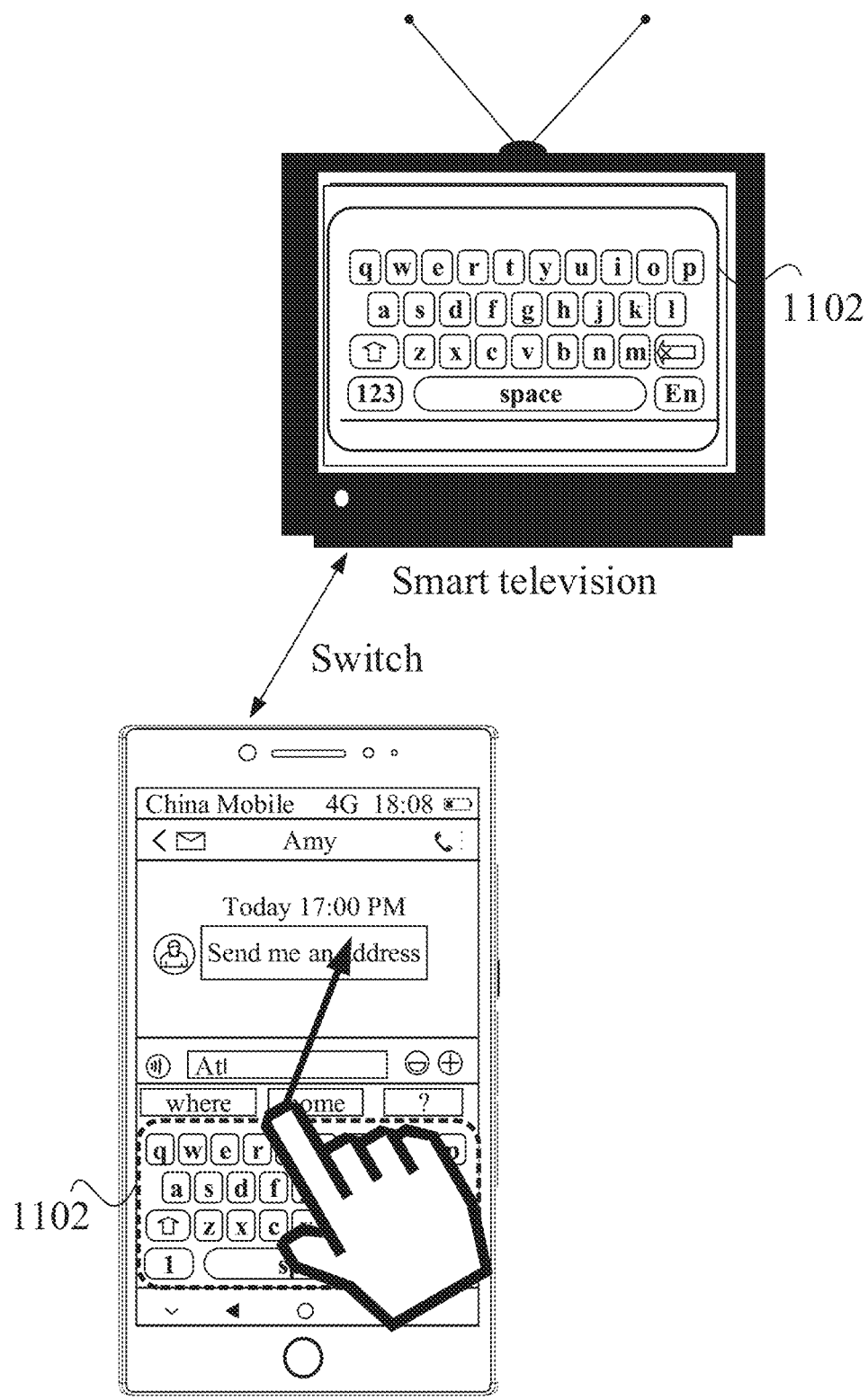
FIG. 21 is a schematic diagram 10 of an application scenario of a display method according to an embodiment of this application.

Further, in this embodiment of this application, the user may alternatively select to switch display content in an area on the display interface of the first display device to the second display device for display. For example, a current display interface of the first display device includes a plurality of display windows, for example, an input method window 1102 and a window of an SMS message application that are displayed by the mobile phone in FIG. 21. In this case, similar to FIG. 20, for different windows, the user may drag a selected window to the to-be-switched-to second display device. When the drag operation points to the smart television, the mobile phone may add the identifier of the smart television to the switching request and send the switching request to the control device. Then, the control device may switch display content in the input method window 1102 from the mobile phone to the smart television according to the switching method described in steps 905 to 908, to continue displaying the display content. Alternatively, the first display device may alternatively divide a screen into different areas in advance, and the user may switch, for different areas, display content in a selected area to the second display device for display. This is not limited in this embodiment of this application.

It may be understood that, to implement the foregoing functions, the control device or the display device include corresponding hardware structures and/or software modules for performing the functions. A person skilled in the art may be easily aware that, in combination with the units, algorithm, and steps in the examples described in the embodiments disclosed in this specification, the embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the foregoing terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is an example, and is merely a logical function division. During actual implementation, another division manner may be used.

Figure 22:
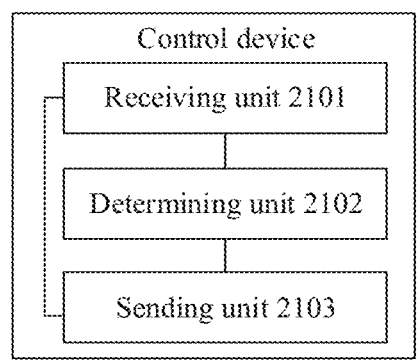
FIG. 22 is a schematic structural diagram of a control device according to an embodiment of this application.

When the function modules are divided based on corresponding functions, FIG. 22 is a possible schematic structural diagram of the control device in the foregoing embodiments. The control device includes a receiving unit 2101, a determining unit 2102, and a sending unit 2103.

The receiving unit 2101 is configured to support the control device in performing the processes 901 and 904 in FIG. 14. The determining unit 2102 is configured to support the control device in performing processes 902 and 909 in FIG. 14. The sending unit 2103 is configured to support the control device in performing the processes 905, 908, and 910 in FIG. 14. All related content of the steps in the foregoing method embodiments may be cited in function descriptions of corresponding function modules, and details are not described herein again.

The determining unit 2102 is configured to perform control management on an action of the control device. The receiving unit 2101 and the sending unit 2103 are configured to support a communication process between the control device and another device. In addition, the control device may further include a storage unit, configured to store program code and data of the control device. For example, the storage unit may be configured to store device information sent by each display device.

When the control device is used as a display device in the display system, the control device may further include a display unit, configured to display information entered by a user or information provided for a user, and various menus of the control device.

For example, the determining unit 2102 may be a processor, the receiving unit 2101 and the sending unit 2103 may be transceiver devices such as RF circuits or Wi-Fi apparatuses, the storage unit may be a memory, and the display unit may be a display. In this case, the control device provided in this embodiment of this application may be the mobile phone 201 shown in FIG. 9.

All or some of the foregoing embodiments may be implemented by means of software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The available medium may be a magnetic medium (for example, a floppy disk, a hard disk, or a magnetic tape), an optical medium (for example, a DVD), a semiconductor medium (for example, a solid state drive Solid State Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display system, comprising a control device, and a first display device, a second display device, and a target display device of a user that communicate with the control device, wherein:
the target display device is configured to:
when needing to display a target service, send a display request to the control device;
the control device is configured to:
in response to receiving the display request, determine the first display device and the second display device that support display of the target service;
request the first display device to report a first distance between the first display device and the user, and request the second display device to report a second distance between the second display device and the user;
receive the first distance between the first display device and the user from the first display device, and receive the second distance between the second display device and the user from the second display device; and
when the first distance is less than the second distance, select the first display device to display the target service, obtain current first display data of the target service from the target display device, and send the current first display data to the first display device;
the first display device is configured to display the target service based on the current first display data;
the control device is further configured to:
when subsequently obtaining that the first distance reported by the first display device is greater than the second distance reported by the second display device, obtain current second display data of the target service from the target display device, and send the current second display data to the first display device and the second display device;
the first display device is further configured to display the target service based on the current second display data; and
the second display device is configured to display the target service based on the current second display data.

2. A display system, comprising a mobile phone and a smart television, wherein:
the mobile phone is configured to:
receive a video call;
after receiving the video call, obtain attribute information of a first to-be-displayed layer, wherein the first to-be-displayed layer is a layer that needs to be displayed for the video call;
select the smart television according to the attribute information; and
send display data of the first to-be-displayed layer to the smart television according to the attribute information; and
the smart television is configured to:
obtain a first distance between a user and the smart television using a distance sensor or a camera disposed on the smart television;
send the first distance between the user and the smart television to the mobile phone;
receive the display data of the first to-be-displayed layer; and
display the first to-be-displayed layer of the video call based on the display data.

3. The display system according to claim 2, wherein the attribute information indicates a size of the first to-be-displayed layer and a privacy attribute of the first to-be-displayed layer; and
wherein the mobile phone is configured to select the smart television when determining that the smart television supports the size of the first to-be-displayed layer and the privacy attribute of the first to-be-displayed layer.

4. The display system according to claim 3, wherein the mobile phone is further configured to:
obtain device information of the smart television before selecting the smart television, wherein the device information of the smart television comprises one or more of screen resolution, a rendering capability of a graphics processing unit (GPU), a frequency of a central processing unit (CPU), a size of a layer that the smart television supports, and privacy attribute of a layer that the smart television supports.

5. The display system according to claim 2, wherein the attribute information indicates a size of the first to-be-displayed layer; and
wherein the mobile phone is configured to select the smart television when determining that the smart television supports the size of the first to-be-displayed layer.

6. The display system according to claim 2, wherein the attribute information indicates a privacy attribute of the first to-be-displayed layer; and
wherein the mobile phone is configured to select the smart television when determining that the smart television supports the privacy attribute of the first to-be-displayed layer.

7. The display system according to claim 2, wherein the mobile phone is configured to:
obtain the first distance between the user and the smart television and a second distance between the user and a display device; and
select the smart television to display the first to-be-displayed layer of the video call when the first distance is less than the second distance.

8. The display system according to claim 2, wherein the mobile phone is configured to:
obtain the first distance between the user and the smart television; and
select the smart television to display the first to-be-displayed layer of the video call when the first distance is less than a preset distance.

9. The display system according to claim 2, wherein the mobile phone is configured to:
obtain a third distance between the user and the smart television and a fourth distance between the user and a display device after sending the display data of the first to-be-displayed layer; and
send display data of a second to-be-displayed layer for the video call to both the smart television and the display device when the third distance is greater than the fourth distance.

10. The display system according to claim 9, wherein the mobile phone is configured to:
obtain the first distance between the user and the smart television;
determine a duration in which the first distance is less than a distance threshold; and
stop sending the display data of the first to-be-displayed layer when the duration is greater than a preset distance threshold.

11. The display system according to claim 10, wherein the mobile phone is configured to:

select the smart television according to the attribute information when the smart television reports a detection result to the mobile phone, wherein the detection result indicates that the user focuses on the smart television, and wherein the detection result is obtained by the camera.

12. A display method, comprising:
receiving, by a mobile phone, a video call;
after receiving the video call, obtaining, by the mobile phone, attribute information of a first to-be-displayed layer, wherein the first to-be-displayed layer is a layer that needs to be displayed for the video call;
selecting, by the mobile phone, a smart television according to the attribute information;
sending, by the mobile phone, display data of the first to-be-displayed layer to the smart television according to the attribute information;
obtaining, by the smart television, a first distance between a user and the smart television using a distance sensor or a camera disposed on the smart television;
sending, by the smart television, the first distance between the user and the smart television to the mobile phone;
receiving, by the smart television, the display data of the first to-be-displayed layer; and
displaying, by the smart television, the first to-be-displayed layer of the video call based on the display data.

13. The display method according to claim 12, wherein the attribute information indicates one or more of a size of the first to-be-displayed layer and a privacy attribute of the first to-be-displayed layer; and
wherein selecting the smart television according to the attribute information comprises:
selecting, by the mobile phone, the smart television when determining that the smart television supports the attribute information.

14. The display method according to claim 12, wherein the method further comprises:
obtaining, by the mobile phone, device information of the smart television before selecting the smart television, wherein the device information of the smart television comprises one or more of screen resolution, a rendering capability of a graphics processing unit (GPU), a frequency of a central processing unit (CPU), a size of a layer that the smart television supports, and privacy attribute of a layer that the smart television supports.

15. The display method according to claim 12, wherein the method further comprises:
obtaining the first distance between the user and the smart television and a second distance between the user and a display device; and
wherein selecting the smart television according to the attribute information comprises:
selecting, by the mobile phone, the smart television to the first to-be-displayed layer of the video call when the first distance is less than the second distance.

16. The display method according to claim 12, wherein the method further comprises:
obtaining the first distance between the user and the smart television; and
wherein selecting the smart television according to the attribute information comprises:
selecting, by the mobile phone, the smart television to the first to-be-displayed layer of the video call when the first distance is less than a preset distance.

17. The display method according to claim 12, wherein the method further comprises:
obtaining, by the mobile phone, a third distance between the user and the smart television;
obtaining, by the mobile phone, a fourth distance between the user and a display device after sending the display data of the first to-be-displayed layer; and
sending, by the mobile phone, display data of a second to-be-displayed layer for the video call to both the smart television and the display device when the third distance is greater than the fourth distance.

18. The display method according to claim 17, wherein the method further comprises:
obtaining the first distance between the user and the smart television;
determining a duration in which the first distance is less than a distance threshold; and
stopping, by the mobile phone, sending the display data of the first to-be-displayed layer when the duration is greater than a preset distance threshold.

19. The display method according to claim 18, wherein selecting the smart television according to the attribute information comprises:
selecting, by the mobile phone, the smart television according to the attribute information when the smart television reports a detection result to the mobile phone, wherein the detection result indicates that the user focuses on the smart television, and wherein the detection result is obtained by the camera.

20. The display system according to claim 1, wherein the first distance between the first display device and the user is obtained using a distance sensor or a camera disposed on the first display device.

* * * * *